(12) United States Patent
Azuma et al.

(10) Patent No.: US 10,919,094 B2
(45) Date of Patent: Feb. 16, 2021

(54) CUTTING DEVICE AND CUTTING METHOD

(71) Applicant: JTEKT CORPORATION, Osaka (JP)

(72) Inventors: Takayuki Azuma, Anjo (JP); Yoshihiko Yamada, Anjo (JP); Kenji Hamada, Kariya (JP); Masahiro Kiji, Kashiwara (JP); Hiroshi Watanabe, Nagoya (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/429,948

(22) Filed: Jun. 3, 2019

(65) Prior Publication Data

US 2019/0283141 A1    Sep. 19, 2019

Related U.S. Application Data

(62) Division of application No. 15/320,222, filed as application No. PCT/JP2015/068182 on Jun. 24, 2015, now Pat. No. 10,391,560.

(30) Foreign Application Priority Data

Jun. 27, 2014  (JP) .................... 2014-132119
Jun. 16, 2015  (JP) .................... 2015-121362

(51) Int. Cl.
  *B23B 27/14*  (2006.01)
  *B23B 27/12*  (2006.01)
  *B23B 1/00*   (2006.01)

(52) U.S. Cl.
  CPC ............. *B23B 27/143* (2013.01); *B23B 1/00* (2013.01); *B23B 27/12* (2013.01)

(58) Field of Classification Search
  CPC ....... B23B 27/12; B23B 27/10; B23B 27/145; B23B 2200/369
  See application file for complete search history.

(56) References Cited

U.S. PATENT DOCUMENTS

| | | | | |
|---|---|---|---|---|
| 1,994,529 A | * | 3/1935 | Meyer .................. | B24B 5/42 451/285 |
| 2,191,777 A | * | 2/1940 | Stone .................. | B23G 1/34 409/66 |
| 2,513,881 A | | 7/1950 | Low | |

(Continued)

FOREIGN PATENT DOCUMENTS

| | | |
|---|---|---|
| CN | 1859992 A | 11/2006 |
| JP | 60-138611 U | 9/1985 |

(Continued)

OTHER PUBLICATIONS

Office Action dated Jun 18, 2019 in Japanese Patent Application No. 2015-121362, 5 pages (submitting English translation only).

(Continued)

*Primary Examiner* — Nicole N Ramos
(74) *Attorney, Agent, or Firm* — Oblon, McClelland, Maier & Neustadt, L.L.P.

(57) ABSTRACT

Cutting machining is performed on a workpiece by making a cutting tool travel relative to the workpiece while rotating the cutting tool such that a peripheral speed of the cutting tool becomes equal to or more than a cutting speed of the cutting tool, while an outer peripheral surface and an end surface of the cutting tool function as a rake surface and a relief surface, respectively.

2 Claims, 15 Drawing Sheets

(56) References Cited

U.S. PATENT DOCUMENTS

| | | | | |
|---|---|---|---|---|
| 2,551,167 | A | | 5/1951 | Rolland |
| 2,864,046 | A | * | 12/1958 | Ailes ....................... G05B 19/06 318/102 |
| 3,212,405 | A | * | 10/1965 | Smith ....................... B23B 5/40 409/132 |
| 3,915,059 | A | | 10/1975 | Pine |
| 4,177,699 | A | * | 12/1979 | Dovnar ..................... B23B 1/00 409/132 |
| 4,181,049 | A | * | 1/1980 | Borisenko ............... B23B 27/12 407/7 |
| 4,223,580 | A | | 9/1980 | Sidorenko |
| 4,586,855 | A | * | 5/1986 | Rawle ....................... B23C 5/06 407/38 |
| 4,606,684 | A | * | 8/1986 | Shaturov ................. B23B 27/12 409/132 |
| 4,663,891 | A | | 5/1987 | Gik |
| 4,692,989 | A | * | 9/1987 | Neubauer ............... B23F 15/08 29/558 |
| 4,813,828 | A | * | 3/1989 | Beck ................... B23B 51/0036 409/132 |
| 4,863,321 | A | * | 9/1989 | Lieser ....................... B23C 3/30 409/165 |
| 4,883,392 | A | * | 11/1989 | Lieser .................. B23Q 27/006 409/165 |
| 5,355,705 | A | | 10/1994 | Schulze |
| 6,053,676 | A | * | 4/2000 | Garschagen .......... B23F 23/006 409/10 |
| 6,394,718 | B1 | * | 5/2002 | Doerfel ................... B23F 5/163 409/132 |
| 8,393,830 | B2 | | 3/2013 | Hideta |
| 8,776,649 | B2 | * | 7/2014 | Sjoo ....................... B23B 27/12 407/113 |
| 2002/0014138 | A1 | * | 2/2002 | Yamazaki ............... B23B 51/04 82/1.11 |
| 2005/0047885 | A1 | | 3/2005 | Hyatt et al. |
| 2007/0049175 | A1 | * | 3/2007 | Kim ........................ B23B 27/12 451/11 |
| 2007/0122245 | A1 | | 5/2007 | Yanagimoto |
| 2008/0086220 | A1 | * | 4/2008 | Ogawa ............... G05B 19/4069 700/15 |
| 2009/0022554 | A1 | * | 1/2009 | Gourraud ............. B23B 27/145 407/113 |
| 2009/0155005 | A1 | * | 6/2009 | Jansson ..................... B23C 5/06 407/114 |
| 2010/0278606 | A1 | * | 11/2010 | Hyatt ....................... B23C 3/18 409/84 |
| 2011/0076105 | A1 | * | 3/2011 | Hideta ..................... B23C 5/28 407/11 |
| 2015/0147129 | A1 | | 5/2015 | Nagata |

FOREIGN PATENT DOCUMENTS

| | | |
|---|---|---|
| JP | 63-267101 A | 11/1988 |
| JP | 3-100012 U | 10/1991 |
| JP | 2006-68831 A | 3/2006 |
| JP | 2007-504011 A | 3/2007 |
| JP | 2011-161628 A | 8/2011 |
| JP | 2014-4650 A | 1/2014 |

OTHER PUBLICATIONS

International Search Report dated Oct. 6, 2015 in PCT/JP15/068182 Filed Jun. 24, 2015.
Combined Chinese Office Action and Search Report dated Mar. 4, 2020, in Patent Application No. 201811452930.5, 28 pages (with unedited computer generated English translation).

* cited by examiner

PERIPHERAL SPEED RATIO 0.0

PERIPHERAL SPEED RATIO 0.2

PERIPHERAL SPEED RATIO 0.5

PERIPHERAL SPEED RATIO 0.9

PERIPHERAL SPEED RATIO 1.0

PERIPHERAL SPEED RATIO 2.0

CUTTING DEVICE AND CUTTING METHOD

The present application is a divisional application of U.S. patent application Ser. No. 15/320,222, filed Dec. 19, 2016, which is a U.S. national stage of PCT/JP2015/068182 filed on Jun. 24, 2015, which claims priority under 35 U.S.C. § 119(b) to Japanese application 2014-132119 filed on Jun. 27, 2014 and Japanese application 2015-121362 filed on Jun. 16, 2015.

TECHNICAL FIELD

This invention relates to a cutting device and a cutting method.

BACKGROUND ART

In a cutting device, when a cutting machining is performed with a cutting tool, such as a cutting tool or the like, on a workpiece made of a difficult-to-cut material, such as Titanium alloy or Inconel, a cutting edge of the cutting tool is kept in contact with the workpiece for a long time with a large cutting resistance force. Accordingly, cutting heat at a high temperature tends to be generated at the contacting portion of the cutting edge. This may cause a deterioration of the tool life.

Under such situation, a rotary cutting method has been proposed, for example, in a Patent Literature 1, in which a rotation axis of a rotatable round-plate shaped cutting tool is arranged in parallel with a cutting traveling direction and the cutting machining is performed on the workpiece, with rotation of the cutting tool, making an end surface of the cutting tool functioning as a rake surface. According to this rotary cutting method, since the cutting tool is rotated, the cutting heat generated on the cutting edge is dispersed in the entire circumference, thereby to improve the tool life.

CITATION LIST

Patent Literature

Patent Literature 1: JP2006-68831 A.

SUMMARY OF INVENTION

Technical Problem(s)

According to the rotary cutting method under the state of art, a highly efficient cutting machining can be performed. However, wear of the cutting edge is tremendous and further improvement in the tool life is still required. Further, according to the rotary cutting method, since the rotation axis of the cutting tool is arranged in parallel with the cutting traveling direction, an influence of a rotation deflection of the cutting tool during cutting machining may be easily transferred on to the surface of the workpiece to be cut. Thus, an issue of worsening of the cutting accuracy of the cutting surface of the workpiece has been raised on this method.

The present invention has been made considering the above circumferences and it is an object of the invention to provide a cutting device and a cutting method which can achieve further improvements in extending a cutting tool life and at the same time which can achieve a high accuracy on cutting machining surface.

Solution to Problem(s)

(Cutting Device)
The cutting device according to the present invention includes a rotating means for rotating a cutting tool about a rotation axis of the cutting tool and a traveling means for making the cutting tool travel relative to a workpiece, wherein the rotating means and the traveling means perform a cutting machining on the workpiece by making the cutting tool travel relative to the workpiece while rotating the cutting tool such that a peripheral speed of the cutting tool becomes equal to or more than a cutting speed of the cutting tool, having an outer peripheral surface and an end surface of the cutting tool function as a rake surface and a relief surface, respectively.

According to the cutting machining by the above cutting tool, a cross-cutting function to cut in the workpiece with the rake surface being rotated and a pulling function to pull and flow out a chip by the rotating rake surface are operated. Therefore, according to this cutting machining, the above functions and a peripheral speed of the cutting tool being equal to or more than a cutting speed of the cutting tool, as well as the dispersion of the cutting heat generated at the cutting edge on the entire outer circumferential surface due to the rotation of the cutting tool, cause the reduction of the cutting resistance force, thereby reducing the temperature generated at the cutting edge. Accordingly, it is possible to perform cutting a difficult-to-cut material at a high efficiency, and the tool life can be improved. Furthermore, since the end surface of the cutting tool functions as a relief surface, the cutting edge of the cutting tool is approximately in parallel with the cutting machining surface, and therefore, the cutting edge is unlikely to come in contact with the cutting machining surface not depending on rotation deflection of the tool. Thus, the cutting accuracy of the cutting machining surface can be improved.

(Cutting Method)
The method for cutting according to the present invention includes a step for rotating an outer peripheral surface of the cutting tool about an axis line of the cutting tool and a step for performing cutting machining on the workpiece by making the cutting tool travel relative to the workpiece, having an outer peripheral surface and an end surface of the cutting tool function as a rake surface and a relief surface, respectively, and by controlling a peripheral speed of the cutting tool to be equal to or more than a cutting speed of the cutting tool. The same or similar effects obtained by the cutting device of the present invention explained above can be obtained by the cutting method of the present invention.

BRIEF EXPLANATION OF ATTACHED DRAWINGS

EMBODIMENTS FOR IMPLEMENTING INVENTION (Mechanical Structure of Cutting Device)

Figure 1:
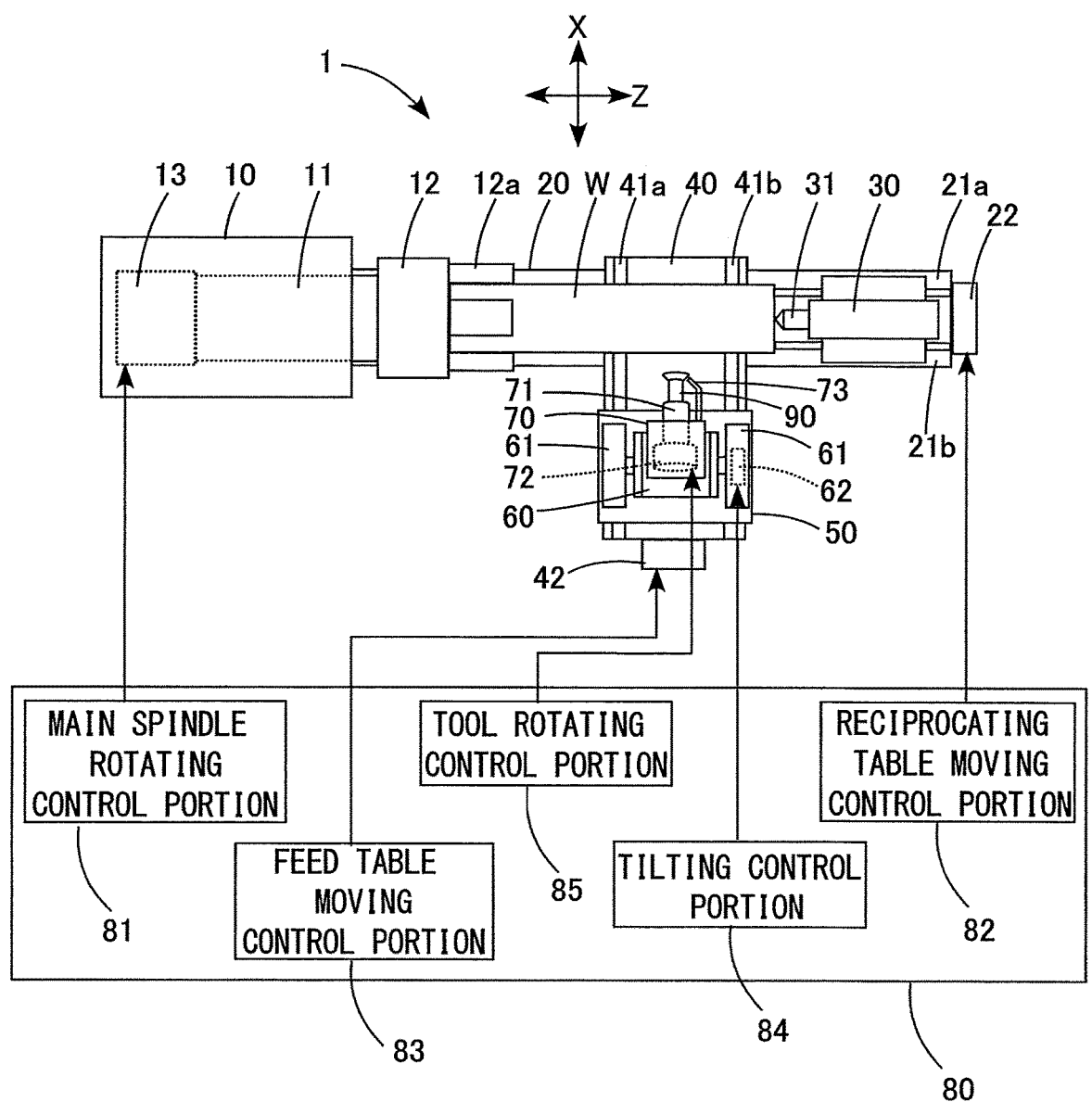
FIG. 1 is a plan view of the entire structure of the cutting device associated with an embodiment of the present invention.

As shown in FIG. 1, the cutting device 1 is formed by a spindle head 10, a bed 20, a tailstock 30, a reciprocating table 40, a feed table 50, a tilt table 60, a tool rest 70 and a control device 80. It is noted here that in the description hereinafter, the axis line direction of a rotary main spindle 11 provided on the spindle head 10 is referred to as a "Z" axis direction, a direction crossing at right angles with the axis line direction of the rotary main spindle 11 within a horizontal plane is referred to as "X" axis line direction.

The spindle head 10 is formed in a rectangular parallelepiped shape and is provided on the bed 20. The rotary main spindle 11 is rotatably provided on the spindle head 10. A chuck 12 is attached to one side of the rotary main spindle 11 and is provided with a pawl portion 12a which is capable of holding the peripheral surface of one end side of a workpiece W. The rotary main spindle 11 is rotatably driven by a main spindle motor 13 which is accommodated in the spindle head 10.

The bed 20 is formed in a rectangular parallelepiped shape and is provided on a floor extending in the "Z" axis direction from the spindle head 10 under the lower portion of the rotary main spindle 11. A pair of "Z" axis guide rails 21a, 21b is provided on the upper surface of the bed 20, extending in the "Z" axis direction and in mutually parallel with each other so that the tailstock 30 and the reciprocating table 40 are slidably guided thereby. Further, a "Z" axis ball screw (not shown) is provided on the bed 20 between the pair of "Z" axis guide rails 21a and 21b for driving the reciprocating table 40 in the "Z" axis direction. A "Z" axis motor 22 is provided for rotatably driving the "Z" axis ball screw.

The tailstock 30 is provided on the pair of "Z" axis guide rails 21a and 21b to be movable in the "Z" axis direction relative to the bed 20. The tailstock 30 is provided with a center 31 which is capable of supporting a free end surface of the workpiece W held by the chuck 12. In other words, the center 31 is provided on the tailstock 30 so that the axis line of the center 31 agrees with the axis line of the rotary main spindle 11.

The reciprocating table 40 is formed in a rectangular plate shape and is provided between the spindle head 10 and the tailstock 30 on the pair of "Z" axis guide rails 21a and 21b so that the reciprocating table 40 is movable in the "Z" axis direction relative to the bed 20. A pair of "X" axis guide rails 41a and 41b is provided on the upper surface of the reciprocating table 40, extending in the "X" axis direction and in mutually parallel with each other so that the feed table 50 is slidably guided thereby. Further, an "X" axis ball screw (not shown) is provided on the reciprocating table 40 between the pair of "X" axis guide rails 41a and 41b for driving the feed table 50 in the "X" axis direction. An "X" axis motor 42 is provided for rotatably driving the "X" axis ball screw.

The feed table 50 is formed in a rectangular plate shape and is provided between the pair of "X" axis guide rails 41a and 41b so that the feed table 50 is movable in the "X" axis direction relative to the reciprocating table 40. A pair of tilt table support portions 61 is provided on an upper surface of the feed table 50 with a predetermined distance apart from each other in the "Z" axis direction. The pair of tilt table support portions supports the tilt table 60.

The tilt table 60 is formed in a cradle shape and is supported by the pair of tilt table support portions 61 so that the tilt table 60 is rotatable (swingable) about the "Z" axis line. The tool rest 70 is arranged on the upper surface of the tilt table 60. One of the pair of tilt table support portions 61 is provided with a tilt motor 62 which rotatably (swingably) drives the tilt table 60 about the "Z" axis line.

A tool holder 71 is provided at the tool rest 70 to be rotatable about the "X" axis line. A tool motor 72 is provided at the tool rest 70 for rotatably driving the tool holder 71 about the "X" axis line. A cutting tool 90, which will be explained later, is chucked by the tool holder 7. Further, the tool rest 70 is provided with a supply nozzle 73 which is connected to a cutting oil supply device (not shown) by which a cutting oil is supplied for cooling the cutting tool 90.

The control device 80 includes a spindle rotation control portion 81, a reciprocating table movement control portion 82, a feed table movement control portion 83, a tilting control portion 84 and a tool rotation control portion 85. It is noted here that each control portion 81 through 85 may be formed separately by individual hardware, respectively or may be structured so as to perform respective functions by using software.

The spindle rotation control portion 81 rotatably drives the rotary main spindle 11 with a predetermined rotation speed by controlling the main spindle motor 13. The reciprocating table movement control portion 82 reciprocates the reciprocating table 40 along the pair of "Z" axis guide rails 21a and 21b by controlling the "Z" axis motor 22.

The feed table movement control portion 83 reciprocates the feed table 50 along the pair of "X" axis guide rails 41a and 41b by controlling the "X" axis motor 42. The tilting control portion 84 rotatably (swingably) drives the tilt table 60 about the "Z" axis line by controlling the tilt motor 62. The tool rotation control portion 85 rotatably drives the cutting tool 90 together with the tool holder 71 by controlling the tool motor 72.

The control device 80 controls the tilt motor 62 to incline the cutting tool 90 with a predetermined angle. Then, the control device 80 controls the main spindle motor 13 and the tool motor 72 to rotate the workpiece W as well as the cutting tool 90. The workpiece is rotated to make the cutting tool travel relative to the workpiece W. Further, the control device 80 controls the "X" axis motor 42 to relatively move the workpiece W and the cutting tool 90 in the "X" axis direction thereby performing the cutting machining on the workpiece W by letting the outer peripheral surface of the cutting tool 90 cross-cut the workpiece W.

It is noted that the tool rest 70, the tool holder 71, the tool motor 72 and the tool rotation control portion 85, etc., correspond to the "rotating means", the spindle head 10, rotary main spindle 11, the main spindle motor 13, the tailstock 30, the tool rest 70, the tool holder 71 and the spindle rotation control portion 81, etc., correspond to the "traveling means" and the tilt table 60, the tilt table support portions 61, the tilt motor 62 and the tilting control portion 84, etc., correspond to the "inclining means".

(Shape of Cutting Tool)

Figure 2A:
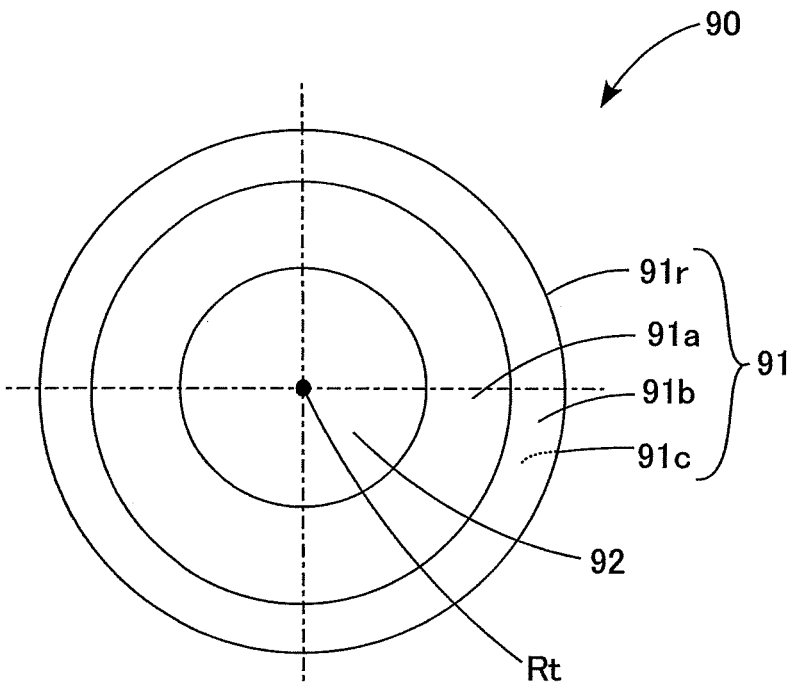
FIG. 2A is a front elevational view of a cutting tool used in the cutting device according to FIG. 1.
Figure 2B:
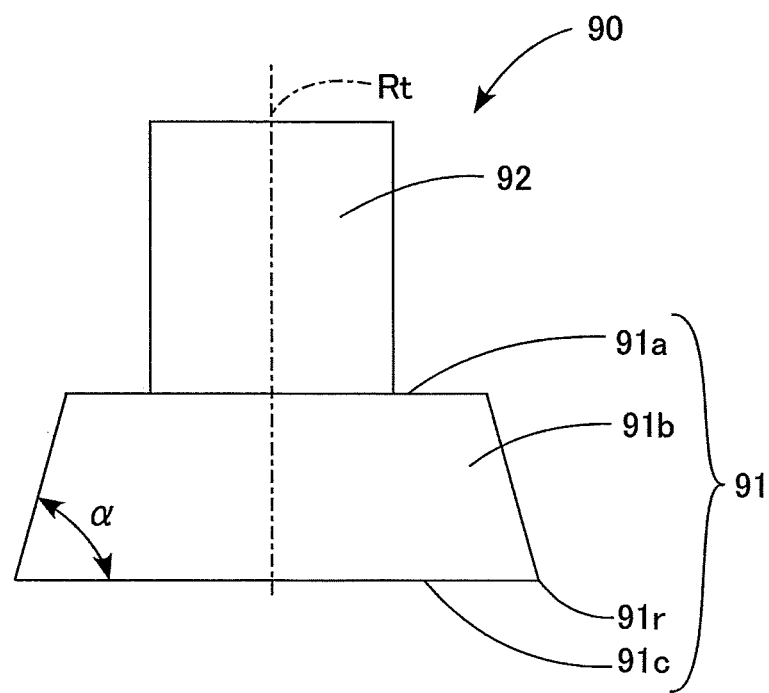
FIG. 2B is a side elevational view of the cutting tool according to FIG. 2A.

As shown in FIGS. 2A and 2B, the cutting tool 90 is formed by a truncated cone shaped tool main body 91 and a columnar shaped tool shaft 92 which extends from the small diameter end surface 91a of the tool main body 91 positioned at the root portion of the tool main body 91. The outer peripheral surface of the tool main body 91 is formed to function as a rake surface 91b. The large diameter end surface of the tool main body 91 is formed to function as a flat relief surface 91c.

The ridgeline formed by the rake surface 91b and the relief surface 91c of the tool main body 91 is formed to be in a continuing circular shape cutting edge 91r, i.e., a circular cutting edge 91r with non-discontinuing portion. The cutting edge angle α of the cutting tool 90, i.e., the angle α formed by the inclination line of the rake surface 91b seen from a direction perpendicular to the rotation axis line Rt and the straight line of the relief surface 91c seen from a direction perpendicular to the rotation axis line Rt is set to be equal to or more than 45 degrees, preferably from 70 to 80 degrees in order to keep the strength of the cutting edge 91r.

(Cutting Method Using Cutting Tool and Cutting Method Using Rotary Tool)

Figure 11A:
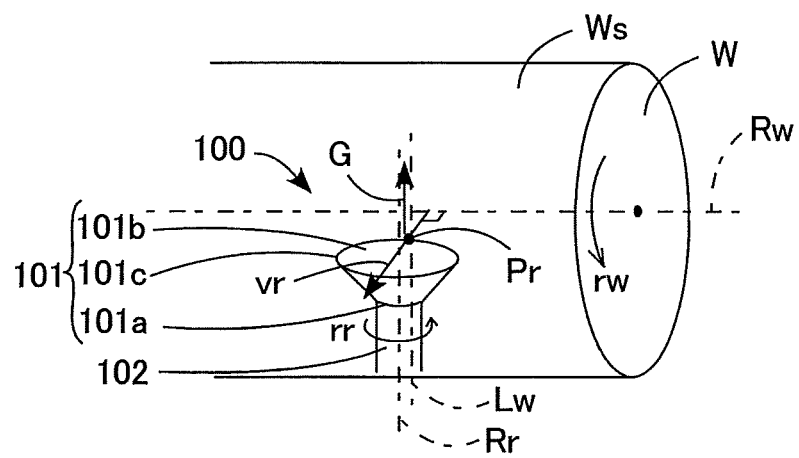
FIG. 11A is a perspective view indicating a state of cutting by a rotary tool.
Figure 11B:
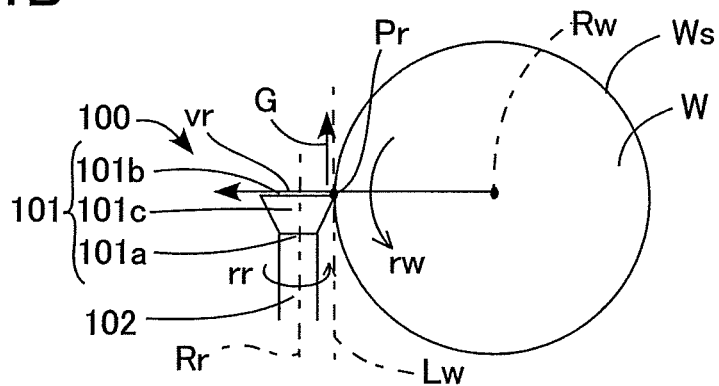
FIG. 11B is a view seen from the rotation axis line of the workpiece shown in FIG. 11A.

Next, the difference between the cutting method using the cutting tool 90 and the cutting method using an existing rotary tool which is relatively close to the cutting method using the cutting tool 90 will be explained with a case of cutting a cylindrically shaped workpiece W. As shown in FIGS. 11A and 11B, the rotary tool 100 is formed by a truncated cone shaped tool main body 101 and a columnar shaped tool shaft 102 which extends from the small diameter end surface 101a of the tool main body 101. The large diameter end surface of the tool main body 101 is formed to function as a rake surface 101b and at the peripheral brim portion of the rake surface 101b, a cutting edge 101c is formed which is in a continuing circular shape, i.e., a non-discontinuing complete circular shape.

According to the cutting method using the rotary tool 100, the rotary tool 100 is rotated in an arrow "rr" direction shown in the drawings. The workpiece W is rotated in an arrow "rw" direction. Then the rotation axis line Rr of the rotary tool 100 is set to be positioned perpendicular to the rotation axis line Rw of the workpiece W and in parallel with a tangential line Lw which passes the cutting point Pr of the cutting machining surface Ws (outer peripheral surface) of the workpiece W. Under this state, the cutting edge 101c of the rotary tool 100 cross-cuts the cutting point Pr of the cutting machining surface Ws of the workpiece W. Thus the cutting machining surface Ws of the workpiece W is cut in the peripheral direction.

During the cutting machining of the workpiece W, the rotary tool 100 slightly deflects by receiving a cutting resistance at the cutting point Pr, but the direction of deflection vr is perpendicular to the rotation axis line Rw of the workpiece W and passing through the cutting point Pr, which is the direction intersecting perpendicularly with the cutting traveling direction G. Accordingly, the cutting edge 100c of the rotary tool 100 is periodically moved away in a radial direction from the cutting machining surface Ws of the workpiece W by the deflection and an influence of a rotation deflection of the rotary cutting tool 100 during cutting machining may be easily transferred on to the cutting machining surface Ws of the workpiece W. Thus, the cutting accuracy of the cutting machining surface Ws of the workpiece W may tend to be worsening.

Figure 4A:
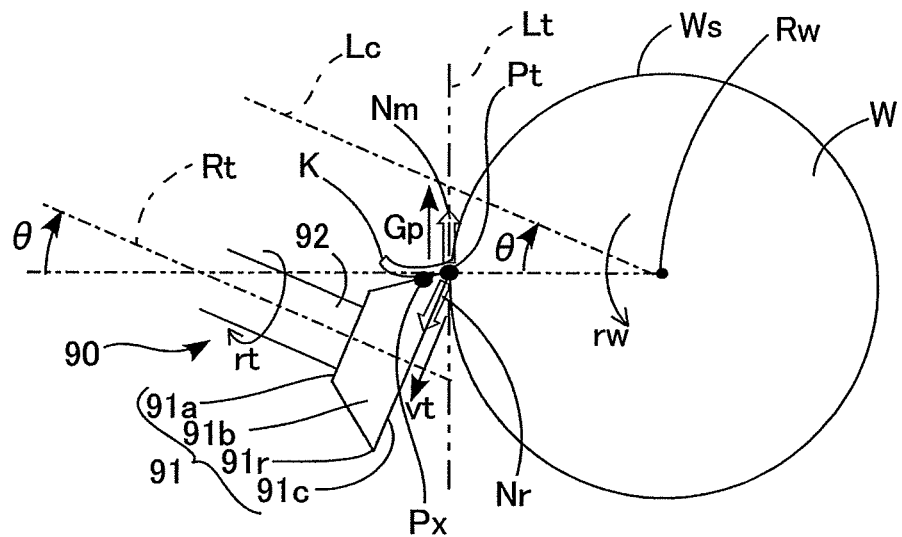
FIG. 4A is a view showing a workpiece seen from a rotation axis line direction thereof under the state of cylindrical cutting by feeding in the plunge cutting direction by the cutting tool according to FIG. 2A and FIG. 2B.

On the other hand, as shown in FIG. 4A, first, the control device 80 controls the cutting tool 90 so that the rotation axis line Rt of the cutting tool 90 is set to be inclined by a predetermined angle θ toward a cutting traveling direction Gp from the state that the rotation axis line Rt is in parallel with the normal of the cutting point Pt. In detail, the straight line Lt, which is perpendicular to the rotation axis line Rw of the workpiece W and is in contact with the cutting point Pt, is inclined by a predetermined angle θ from a cutting traveling direction Gp centering around the rotation axis line Rw of the workpiece W to obtain a straight line Lc and then the rotation axis line Rt of the cutting tool 90 is inclined to be in parallel with the obtained straight line Lc. Thus, the contact between the relief surface 91c of the cutting tool 90 and the cutting machining surface Ws of the workpiece W can be avoided.

Figure 4B:
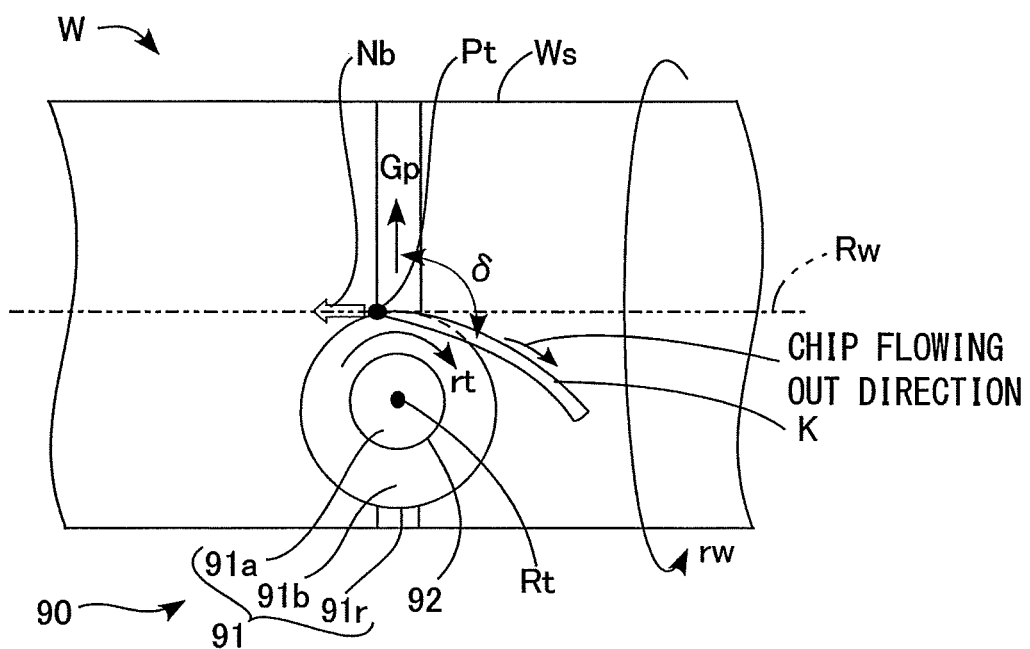
FIG. 4B is a view of the workpiece seen in a right angle direction relative to the rotation axis line direction according to FIG. 4A.

As shown in FIGS. 4A and 4B, according to the cutting method using the cutting tool 90, although the cutting tool 90 may slightly deflect by the cutting resistance force received at the cutting point Pt, the direction of deflection vt is inclined by an angle θ in an inclined direction of the cutting tool 90 relative to the direction of the straight line Lt perpendicular to the rotation axis line Rw of the workpiece W and passing through the cutting point Pt, that is, the direction rotated by the supplementary angle of the inclined angle θ (180−θ) degree relative to the cutting traveling direction Gp. Accordingly, the periodical separation of the cutting edge 91r of the cutting tool 90 from the cutting machining surface Ws of the workpiece W in a radial direction caused by the deflection becomes less frequent and an influence of the rotation deflection of the cutting tool 90 during cutting machining becomes very difficult to be transferred on to the cutting machining surface Ws of the workpiece W. Thus, the cutting accuracy of the cutting machining surface Ws can be improved.

Next, as shown in FIGS. 4A and 4B, the control device 80 rotates the rake surface 91b of the cutting tool 90 about the rotation axis line Rt in a rotation direction rt and at the same time rotates the workpiece W about the rotation axis line Rw in a rotation direction rw, thereby to perform cutting machining on the cutting machining surface Ws of the workpiece W. According to the rotary tool 100, the large diameter end surface of the tool main body 101 serves as the rake surface 101b when cutting machining is performed, but according to the cutting tool 90, the cutting machining is performed such that the rake surface 91b of the cutting tool 90 is rotated to perform a cross-cutting function to cut-in the cutting machining surface Ws and to perform a pulling function to pull and flow out a chip K by the rotating rake surface 91b of the cutting tool 90.

Figure 5:
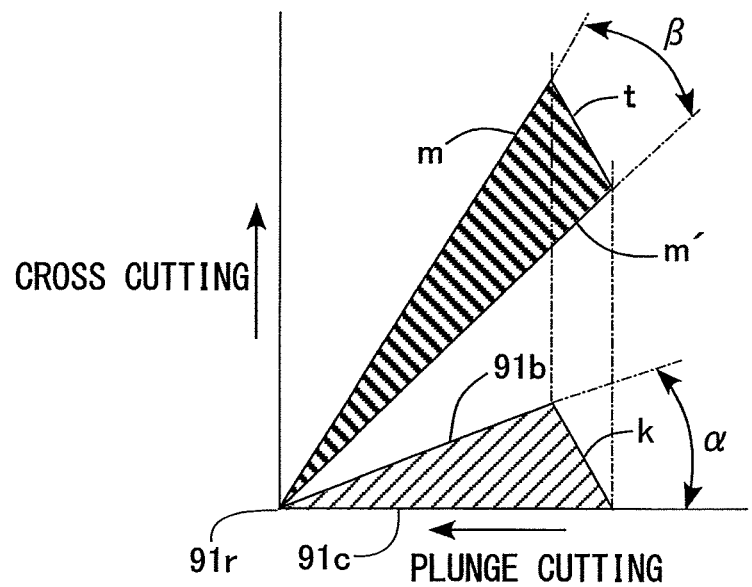
FIG. 5 is a view for explaining an image of cross-cutting function by setting a plunge cutting direction as a horizontal axis and a cross-cutting direction as a vertical axis.

FIG. 5 is an explanatory view explaining an image of the cross-cutting operation, wherein the horizontal axis indicates the plunge cutting direction and the vertical axis indicates the cross-cutting direction. The cutting edge angle α of the cutting tool 90 can be considered to be the cutting edge angle when the cutting machining is performed by plunge cutting operation where the cutting tool 90 is not rotated. Therefore, by setting the cutting edge 91r as the intersecting point of the horizontal and vertical axes and the relief surface 91c as the horizontal axis, when the cutting tool 90 is seen from the direction perpendicular to the rotation axis line in FIG. 5, the cutting edge angle α can be regarded as the angle formed by the rake surface 91b and the relief surface 91c. Then, the nominal cutting edge angle β of the cutting tool 90 upon cross-cutting is considered to be the cutting edge angle of the cutting tool 90 upon cutting machining when the cutting tool 90 is rotated. Accordingly, the nominal cutting edge angle β is the angle formed by the lines m and m' which are formed by connecting both ends of a line "t" with the cutting edge 91r. The line "t" is formed by translating a randomly selected line that passes the rake surface 91b and the relief surface 91c, in a cross-cutting direction.

Figure 6:
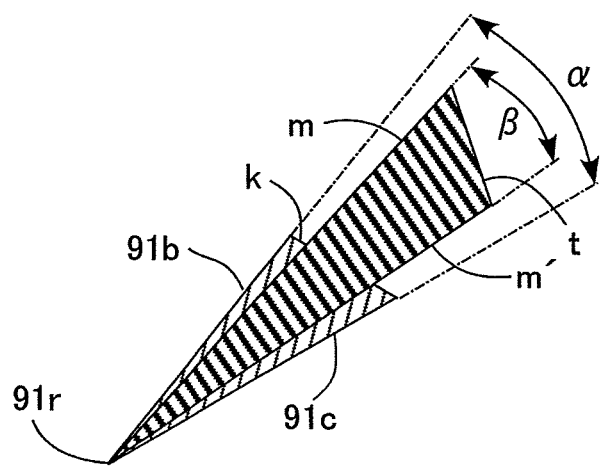
FIG. 6 is a view showing a comparison in largeness by overlapping between an apparent blade edge angle of the cutting tool upon cross-cutting and a blade edge angle of the cutting tool upon plunge-cutting.

As is apparent from FIG. 6, the nominal cutting edge angle β of the cutting tool 90 upon cross-cutting is more acute than the cutting edge angle α of the cutting tool 90 upon plunge cutting operation. Thus, according to the cutting machining using the cutting tool 90, the cutting resistance force can be reduced to thereby lower the temperature of the cutting edge 91r. Therefore, the tool life of the cutting tool 90 can be improved. Further, the sheer angle δ (See FIG. 4B) of the cutting tool 90, i.e., the angle formed by the flow out direction of the chip K and the cutting traveling direction Gp becomes larger than the sheer angle formed at the cutting machining under the plunge cutting operation, where the cutting machining is performed by plunge cutting without rotating the cutting tool 90. Thus, the reduction of the cutting resistance force by the cutting machining using the cutting tool 90 can be achieved and the temperature of the cutting edge 91r can be also reduced and accordingly, the tool life of the cutting tool 90 can be improved.

Figure 7:
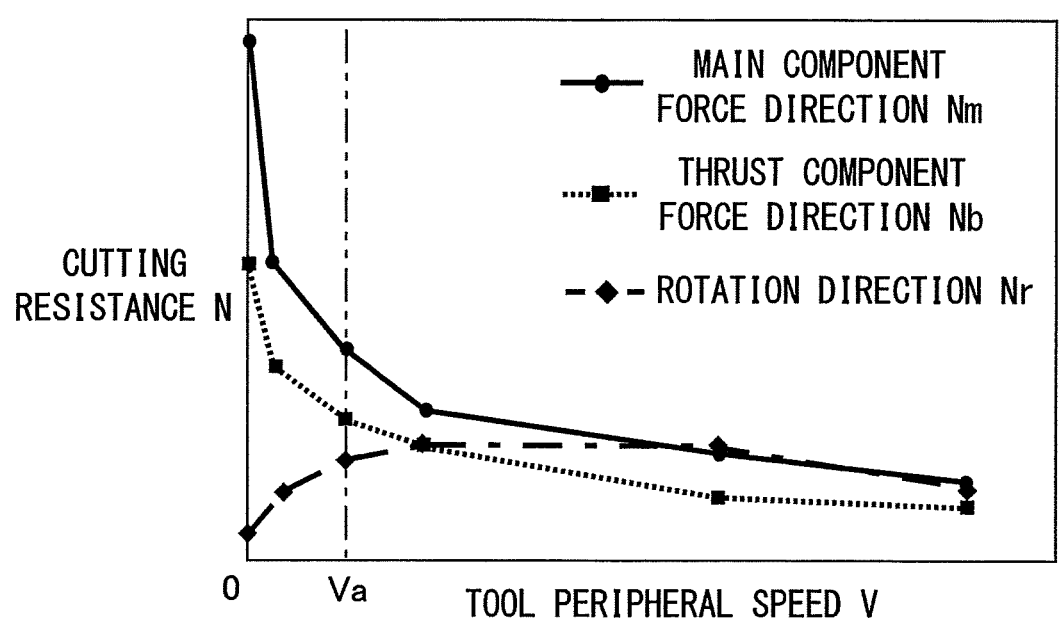
FIG. 7 is a view showing an actually measured relationship between a tool peripheral speed and a cutting resistance.

FIG. 7 shows a relationship between the actually measured peripheral speed V of the cutting tool 90 (hereinafter referred to as "tool peripheral speed") and the cutting resistance N. The tool peripheral speed V is a rotation speed at the cutting point Pt (See FIG. 4A) on the cutting edge 91r. As the cutting resistance N, the inventors of the application measured a cutting resistance Nm (See FIG. 4A) in a main component force direction perpendicular to the rotation axis line Rt of the cutting tool 90 and the rotation axis line Rw of the workpiece W at the cutting point Pt, a cutting resistance Nb (See FIG. 4B) in a thrust component force direction perpendicular to the rotation axis line Rt of the cutting tool 90 and in parallel with the rotation axis line Rw of the workpiece W (direction perpendicular to the main component force direction) and a cutting resistance Nr (See FIG. 3A) in a rotational direction of the cutting tool 90.

Further, as shown in FIG. 7, the cutting resistance Nm in the main component force direction and the cutting resistance Nb in the thrust component force direction are large when the tool peripheral speed V is zero (0), where the plunge cutting is performed. However, as the tool peripheral speed V increases, the values of the cutting resistance Nm and Mb become small and thereafter become approximately constant. Particularly, when the tool peripheral speed V becomes more than the value Va which is the same speed as the cutting speed, the values of the cutting resistance Nm and Mb are largely reduced. It is noted that the cutting resistance Nr in the rotational direction becomes gradually increased as the tool peripheral speed V becomes increased and then finally becomes approximately constant.

Further, when the tool peripheral speed V is zero (0), a short and thick chip K is flown out. However, as the tool peripheral speed V increases, a long and thin chip K, which length is equal to or more than a cutting machining distance, is flown out. (See FIGS. 4A and 4B). It is assumed that the flowing out speed of the chip K is slower than the cutting speed when the tool peripheral speed V is zero and therefore the chip is plastically deformed and the chip K becomes thicker in thickness and shorter in length, however the flowing out speed of the chip K becomes faster, as the tool peripheral speed V increases by the largely operated cross-cutting and pulling functions, and therefore, the thickness of the chip becomes thinner and the length thereof becomes longer. As explained above, according to the cutting machining using the cutting tool 90, a highly efficient cutting can be obtained in a cutting machining of a difficult-to-cut material, such as Titanium alloy or Inconel, the high temperature thereof having been the problem upon cutting machining thereof.

According to the cutting method using the cutting tool 90, the ratio of peripheral speed between the tool peripheral speed and the peripheral speed of the workpiece W (hereinafter, the latter is referred to as "workpiece peripheral speed" and the ratio of "tool peripheral speed/workpiece peripheral speed" is referred to simply as "peripheral speed ratio", which corresponds to the "speed ratio" of the invention) plays a very important role on the result, etc., of the tool life improvement. In other words, when the peripheral speed ratio changes, the friction work between the cutting tool 90 and the workpiece W changes, which leads to the frictional abrasion of the cutting tool 90. When the peripheral speed ratio is set to be 1.0, the friction work between the cutting tool 90 and the workpiece W becomes the minimum value and therefore the effect of the tool life improvement can be achieved.

As some examples of changing of the peripheral speed ratio, cutting machining of the workpiece W which outer peripheral surface is tapered or stepped, cutting machining of the workpiece W which needs machining path over a plurality of times and cutting machining of the end surface of the workpiece W can be raised. In these cases, since the diameter of the workpiece W (hereinafter referred to as "workpiece diameter") is changed during the cutting machining, the workpiece peripheral speed also changes and further the peripheral speed ratio changes accordingly. As some other examples, the peripheral speed ratio changes due to the tool frictional abrasion or due to the tool re-grinding operation, etc. In these cases, the tool diameter of the cutting tool 90 changes and therefore, the tool peripheral speed changes and eventually the peripheral speed ratio changes.

Figure 8A:
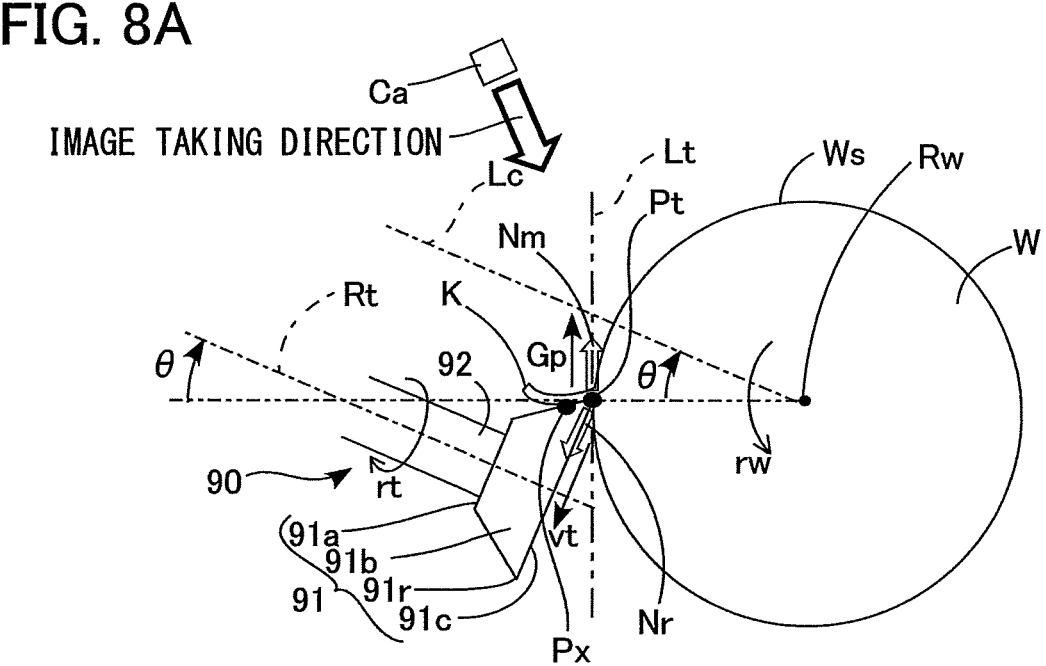
FIG. 8A is a view of the workpiece seen from the rotation axis line direction, indicating an imaging direction when taking an image of the workpiece by a high speed camera under the cylinder cutting state, feeding in the plunge cutting direction by the cutting tool according to FIGS. 2A and 2B.
Figure 8B:
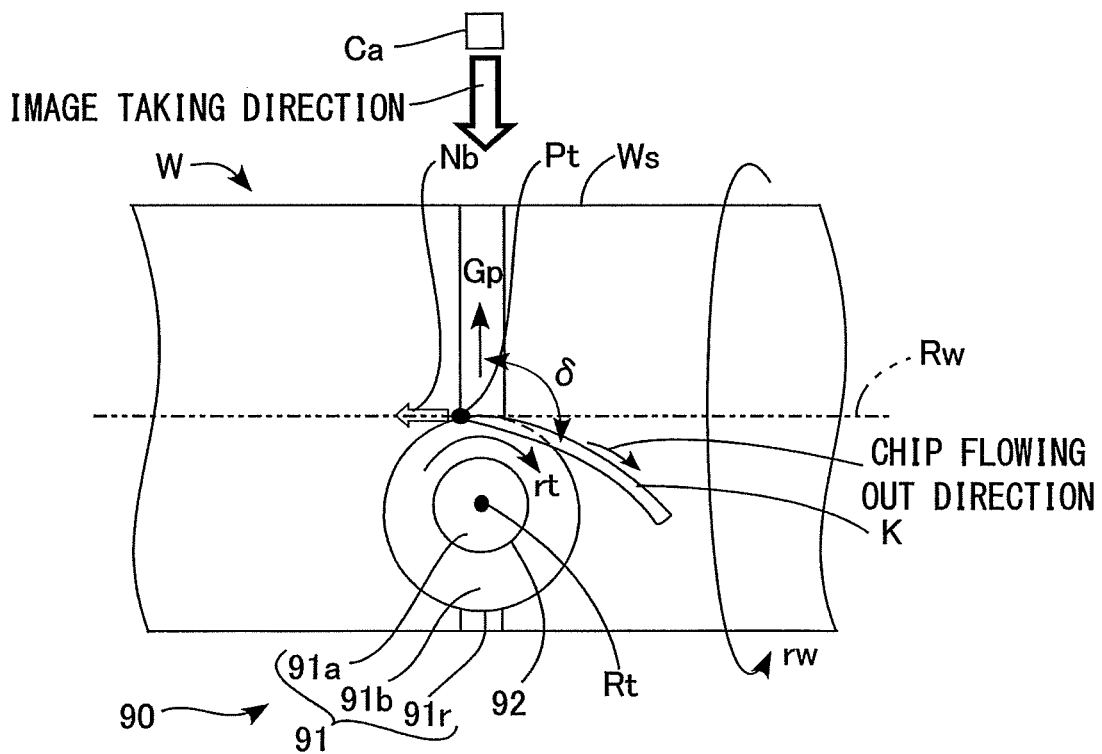
FIG. 8B is a view of the workpiece seen from a right angle direction relative to the rotation axis line in FIG. 8A.

As shown in FIGS. 8A and 8B which correspond to the states of FIGS. 4A and 4B, respectively, a high speed camera Ca is set to be able to take the images seen from the arrow direction in the drawings. The control device 80 analyzes the images of the chip K flowing out state taken by the high speed camera Ca, by changing the peripheral speed ratio from 0.0 to 2.0. Thus, the chip K flowing out angle formed by the flowing out direction of the chip K relative to the cutting edge 91r of the cutting tool 90.

Figure 9A:
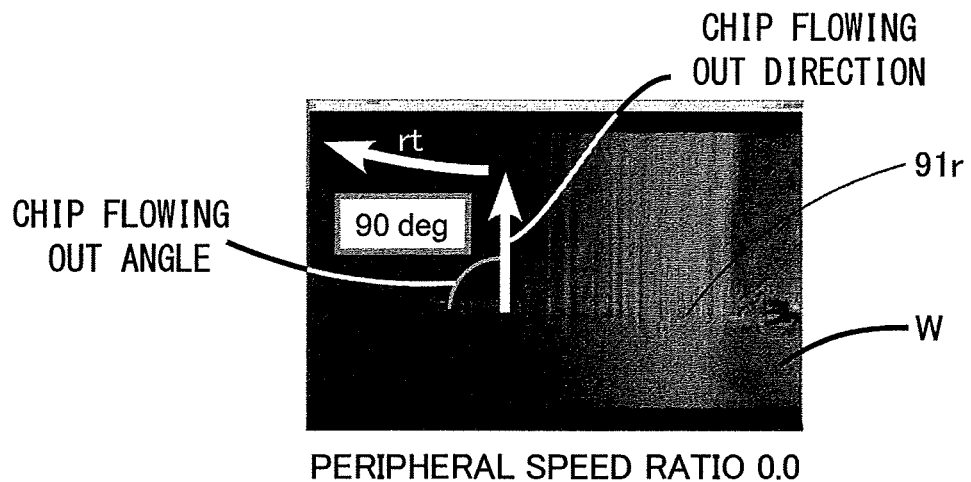
FIG. 9A is a first view indicating the image taken by the high speed camera by changing the peripheral speed ratio.
Figure 9B:
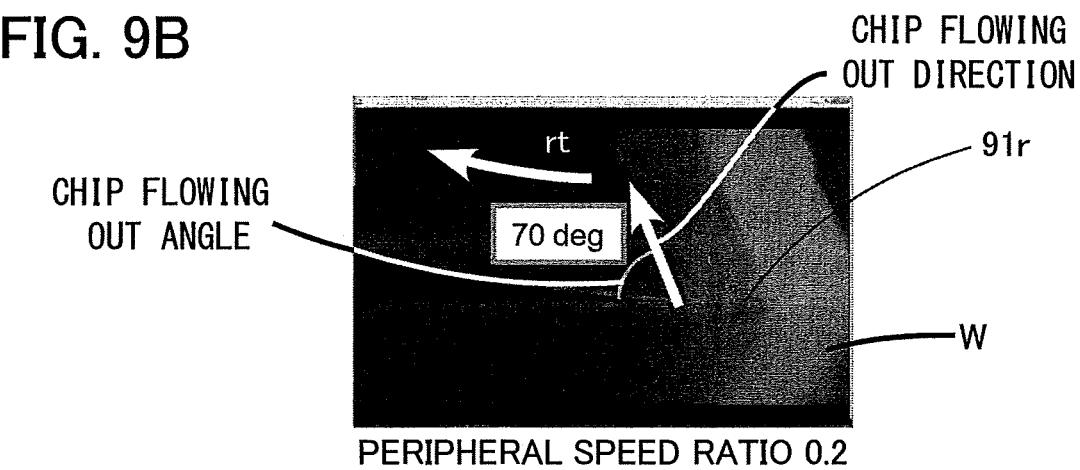
FIG. 9B is a second view indicating the image taken by the high speed camera by changing the peripheral speed ratio.
Figure 9C:
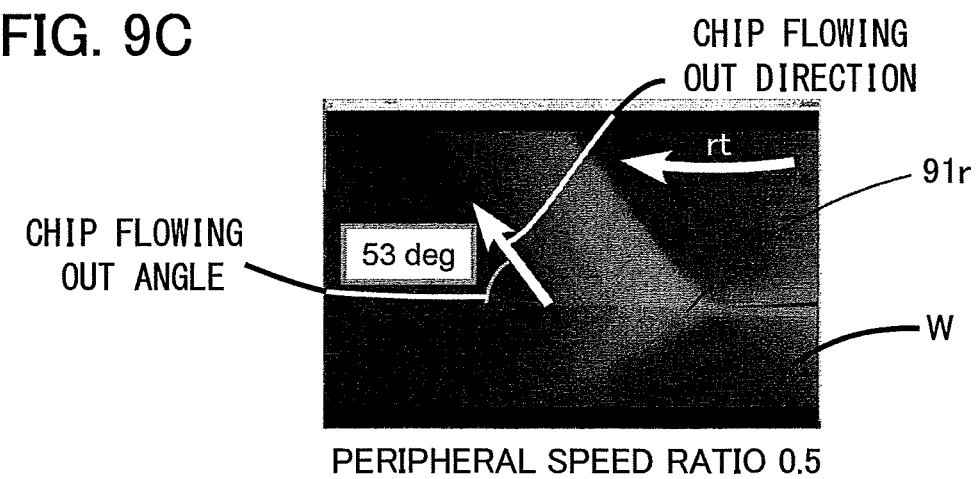
FIG. 9C is a third view indicating the image taken by the high speed camera by changing the peripheral speed ratio.
Figure 9D:
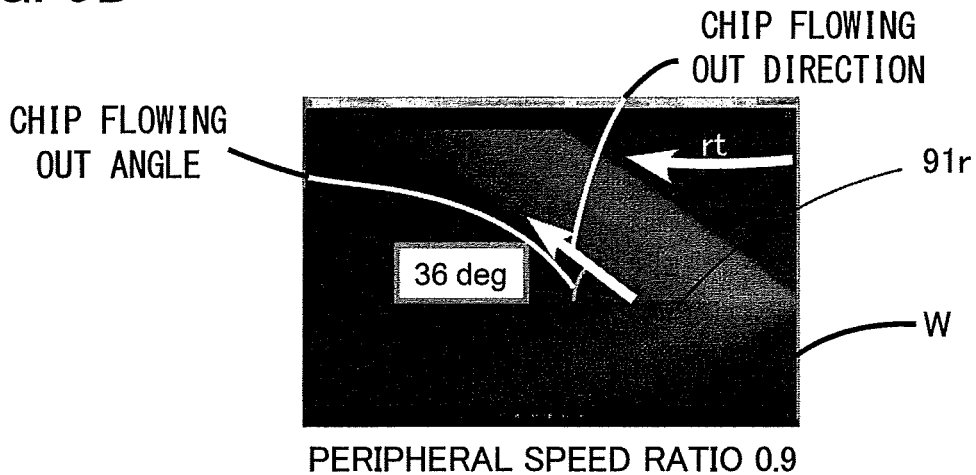
FIG. 9D is a fourth view indicating the image taken by the high speed camera by changing the peripheral speed ratio.
Figure 9E:
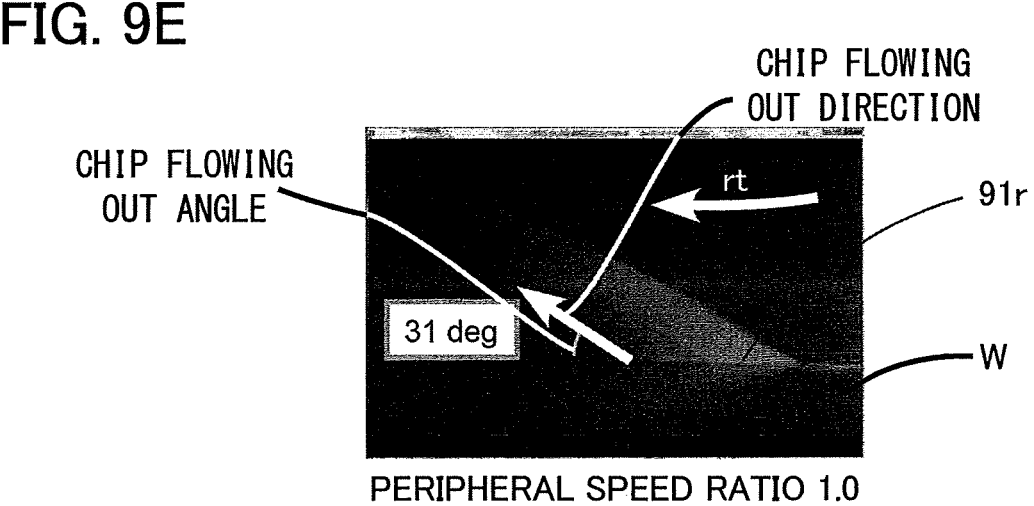
FIG. 9E is a fifth view indicating the image taken by the high speed camera by changing the peripheral speed ratio.
Figure 9F:
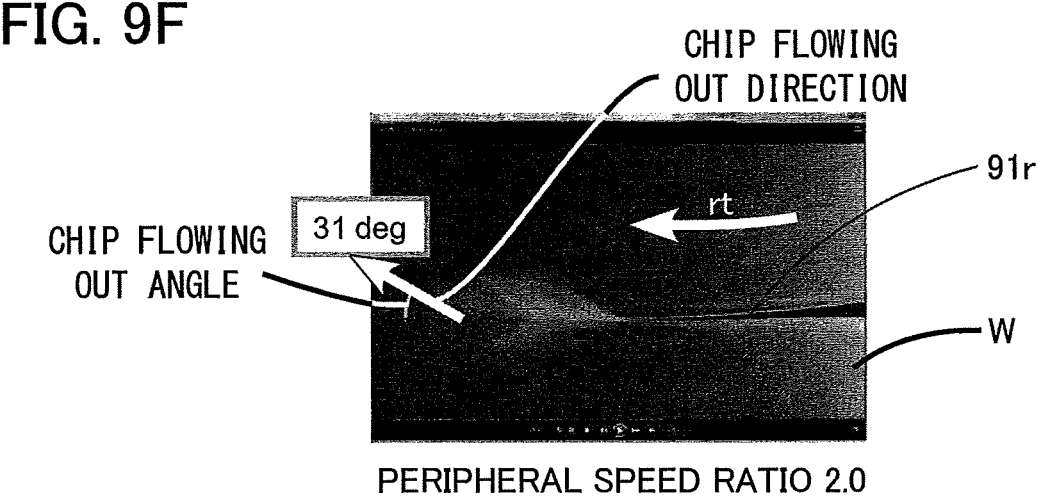
FIG. 9F is a sixth view indicating the image taken by the high speed camera by changing the peripheral speed ratio.
Figure 10A:
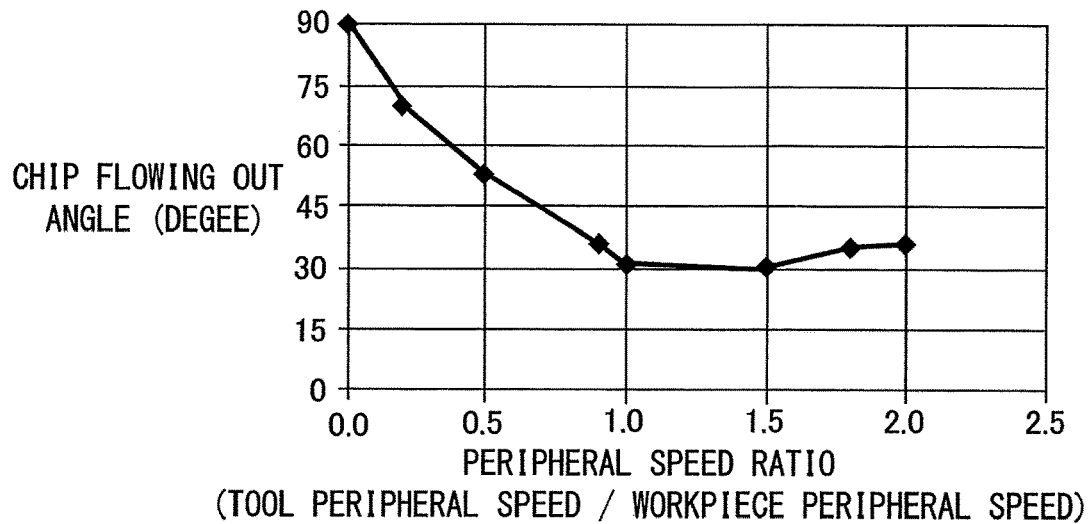
FIG. 10A is a view showing a relationship between a chip flowing out angle and the peripheral speed ratio.

As the result, as shown in FIGS. 9A and 10A, when the peripheral speed ratio is 0.0 (rotation of the cutting tool 90 is stopped), the chip K is flown out from the cutting edge 91r in a perpendicular direction to the straight line Lt, i.e., the chip K is flown out with a flowing out angle of 90 degrees. Then, as shown in FIGS. 9B through 9F and FIG. 10A, the chip K flowing out angle becomes gradually reduced in the rotational direction "rt" of the cutting tool 90 from the flowing out angle of 90 degrees at the peripheral speed ratio of 0.0, as the peripheral speed ratio becomes increased from the ratio of 0.2 to 2.0. Thus, the inventors found out that the flowing out angle changed from 70 degrees to 31 degrees.

Figure 10B:
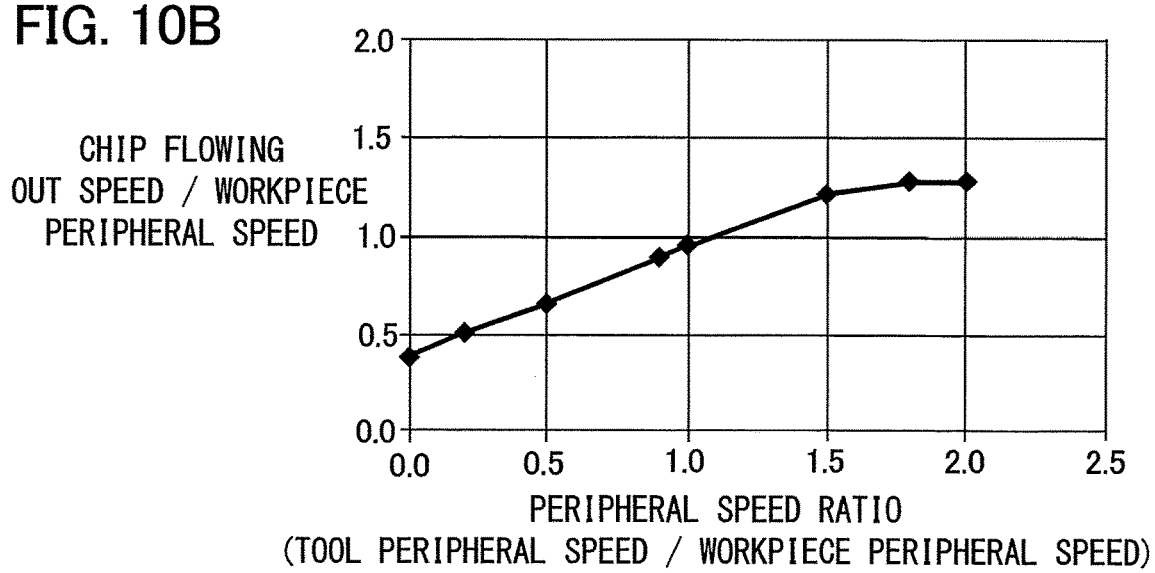
FIG. 10B is a view showing a relationship between a chip flowing out speed ratio and the peripheral speed ratio.

Then, the inventors analyzed the images taken by the high speed camera Ca and obtained the flowing out speed of the chip K. The result of the analysis is illustrated in FIG. 10B, wherein it was confirmed that when the peripheral speed ratio becomes equal to or more than 0.2, the ratio between the chip flowing out speed and the workpiece peripheral speed (hereinafter referred to as "flowing out speed ratio") becomes large. It is considered that the pulling function of the chip K can be more easily obtained when the flowing out angle is small and the flowing out speed ratio is large. In view of this observation and the results thereof shown in FIGS. 10A and 10B, the peripheral speed ratio is set to be 0.2 or more and the chip K flowing out angle is set to be from 30 degrees to 70 degrees.

Figure 10C:
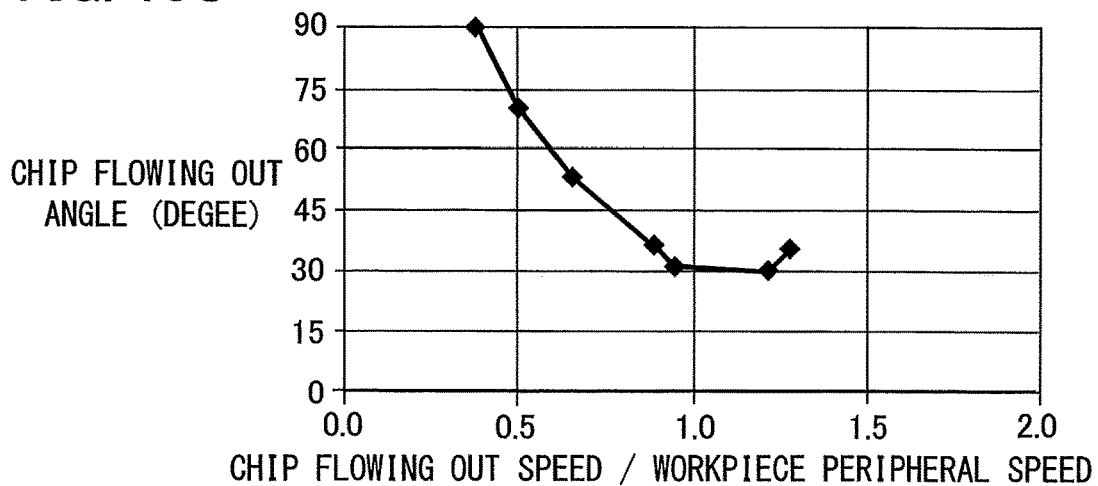
FIG. 10C is a view showing a relationship between the chip flowing out angle and the chip flowing out speed ratio.

Further, by setting the peripheral speed ratio to 1.0, the friction work between the cutting tool 90 and the workpiece W becomes minimum and the tool life improvement effect can be obtained. Further, when the peripheral speed ratio becomes 2.0, the chip K repeats segmentation after the length of the chip K becomes a predetermined value. Accordingly, by setting the peripheral speed ratio to be less than 2.0, the connected chips K can be flown out continuously. Further, when the cutting machining is continued by the peripheral speed ratio of a constant value exceeding 2.0, the friction work between the chips K and the workpiece W increases which may tend to reduce the tool life. From these observation points and the result thereof shown in FIG. 10C, the peripheral speed ration is set to be equal to or more than 1.0 and less than 2.0 and the flowing out speed ratio is set to be equal to or more than 0.5 and equal to or less than 1.3. It is noted here that in order to achieve the tool life improvement effect by minimizing the friction work between the cutting tool 90 and the workpiece W and yet to prevent chips K from getting entangled in the workpiece W or the like by continuously flowing out the connected chips K, the peripheral speed ratio is preferably set to be equal to or more than 1.0 and equal to or less than 2.0.

(Cutting Control Using Cutting Tool)

Next, the control using the cutting tool 90 for cutting the cylindrical workpiece W by rotating the workpiece W in the axis line Rw thereof, feeding in a plunge cutting direction will be explained. According to the cutting using the cutting tool 90, the control is made to maintain the peripheral speed ratio to be constant within a certain range. Such control will be explained with reference to the flowchart shown in FIG. 3.

Figure 3:
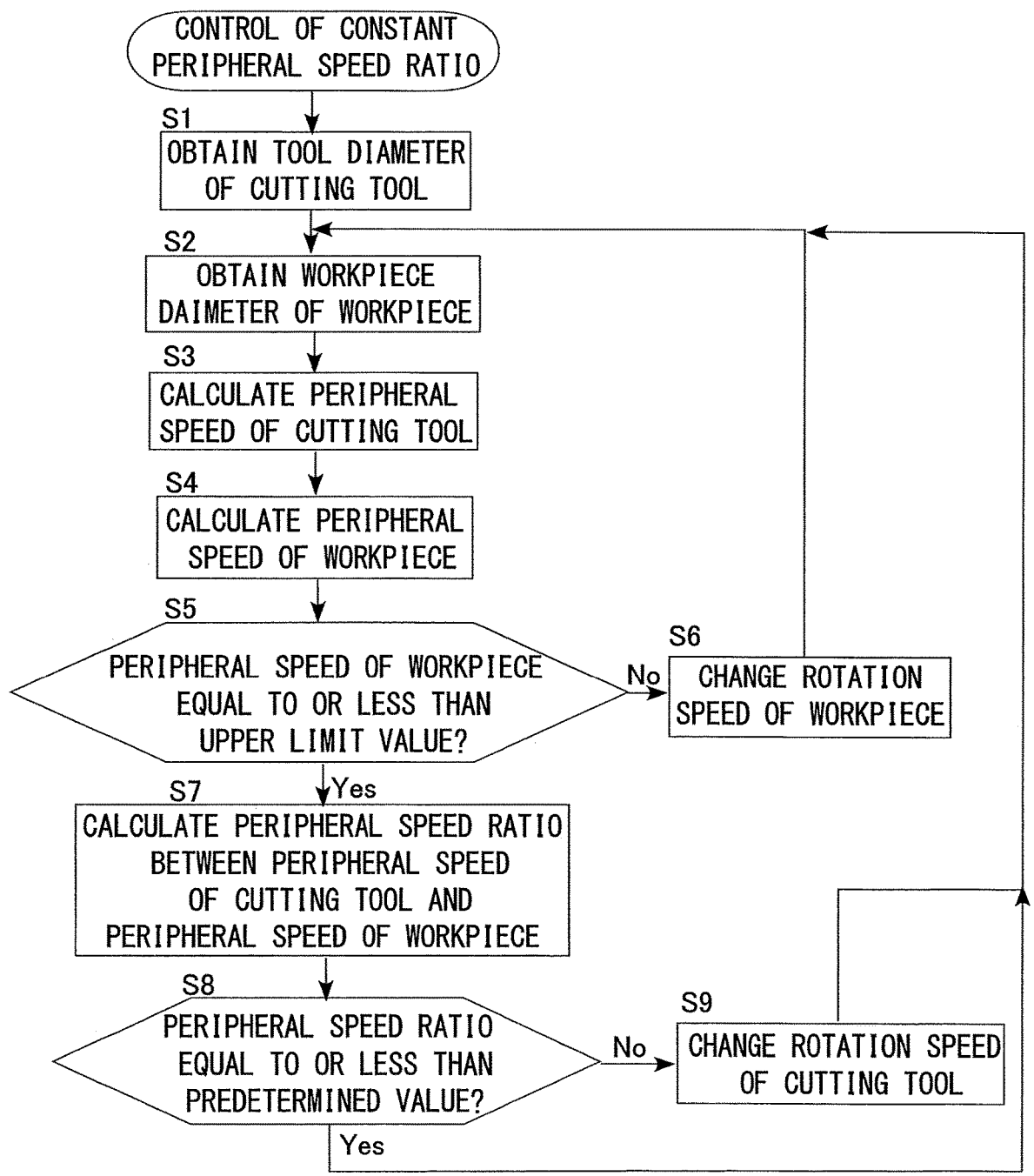
FIG. 3 is a flowchart explaining a cylindrical cutting control by feeding in a plunge cutting direction using the cutting tool according to FIG. 2A and FIG. 2B.

The control device 80 obtains the tool diameter (Step S1: FIG. 3) and then obtains the workpiece diameter (Step S2: FIG. 3). It is noted here that the tool diameter is obtained by actually measuring using the measurement device. The tool diameter may be either a diameter of the actually measured relief surface 91c (cutting edge 91r), i.e., a diameter of the circle perpendicular to the rotation axis line Rt which passes through the cutting point Pt in FIG. 4A or a diameter at a middle portion of the contact length between the cutting wedge 91r and the chip K at the actually measured rake surface 91b, i.e., a diameter of a circle perpendicular to the rotation axis line Rt passing through the point Px in FIG. 4A. The diameter of the workpiece W can be obtained based on the design drawing and an NC program.

Next, the control device 80 calculates the tool peripheral speed based on the obtained tool diameter (Step S3: FIG. 3, corresponding to the peripheral speed obtaining means of the invention) and calculates the workpiece peripheral speed based on the obtained workpiece diameter (Step S4; FIG. 3, corresponding to the "traveling speed obtaining means" of the invention). The tool peripheral speed V is a rotation speed at the cutting point Pt (in FIG. 4A) on the cutting edge 91r and is represented by the following numerical formula (1) by the tool diameter D and the spindle rotation speed N of the rotary main spindle 11. The workpiece peripheral speed "v" is a rotation speed at the cutting point Pt (in FIG. 4A) on the cutting machining surface Ws and is represented by the numerical formula (2) by the workpiece diameter d and the workpiece rotation speed "n" of the workpiece W.

[M1]

$$V = \pi \cdot D \cdot N \quad (1)$$

[M2]

$$v = \pi \cdot d \cdot n \quad (2)$$

Next, the control device 80 judges whether the calculated workpiece peripheral speed is a value equal to or less than a predetermined upper limit value which would not largely influence on the abrasion of cutting tool 90 or not (Step S5: FIG. 3) and if judged that the workpiece peripheral speed exceeds the predetermined upper limit value, the control device 80 changes the rotation speed of the workpiece W (Step S6: FIG. 3) and returns the program step to the step S2 and repeats the preceding processes. The change of the rotation speed of the workpiece W is made with the range of ±6%~±10% relative to the current rotation speed of the workpiece W.

On the other hand, at the step S5, when the control device 80 judges that the workpiece peripheral speed is equal to or less than the predetermined upper limit value, the control device 80 calculates the peripheral speed ratio based on the calculated tool peripheral speed and the workpiece peripheral speed (Step S7 in FIG. 3, corresponding to the "speed ratio calculating means" of the invention). The peripheral speed ratio "y" is represented by the following numerical formula (3) by the tool peripheral speed V and the workpiece peripheral speed "v".

[M3]

$$y = V/v \quad (3)$$

Next, the control device 80 judges whether the calculated peripheral speed ratio exceeds a predetermined range or not (Step S8: FIG. 3) and if it is judged that the peripheral speed ratio exceeds the predetermined range, the control device 80 changes the rotation speed of the cutting tool 90 (Step S9; FIG. 3) and returns the program step to the step S2 and repeats the preceding processes. On the other hand, when the control device 80 judges that the peripheral speed ratio is within the predetermined range, the control device 80 continues the cutting machining and returns the program step to the step S2 and repeats the preceding processes. It is noted that the "predetermined range" means for example the range of ±10%~±20% relative to the value "1.0". Further, the change of the rotation speed of the cutting tool 90 is made with the range of ±5%~±10% relative to the current rotation speed of the cutting tool 90. The above processes continue until the cutting machining of the cylindrical workpiece W ends.

(Other Embodiments of Cutting Tool)

Figure 12A:
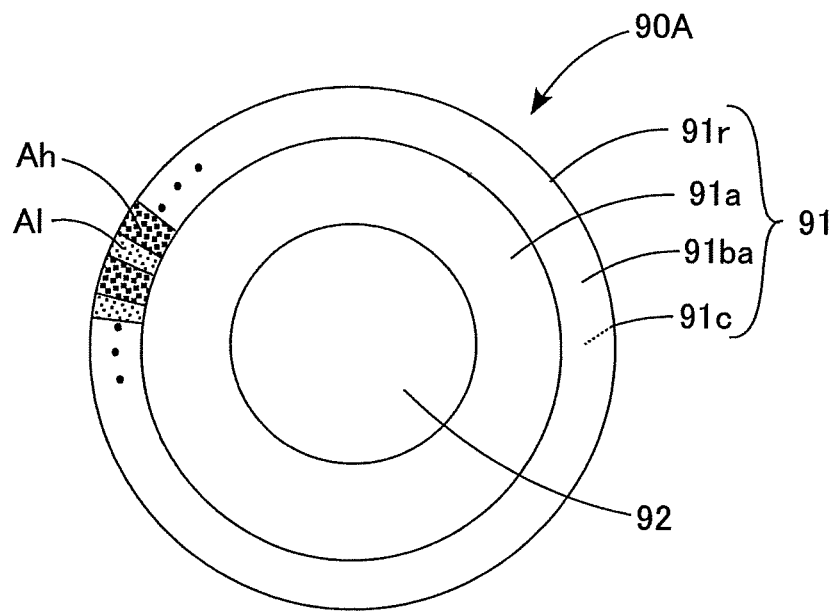
FIG. 12A is a front elevational view of the cutting tool according to a first modified embodiment used in the cutting device of FIG. 1.
Figure 12B:
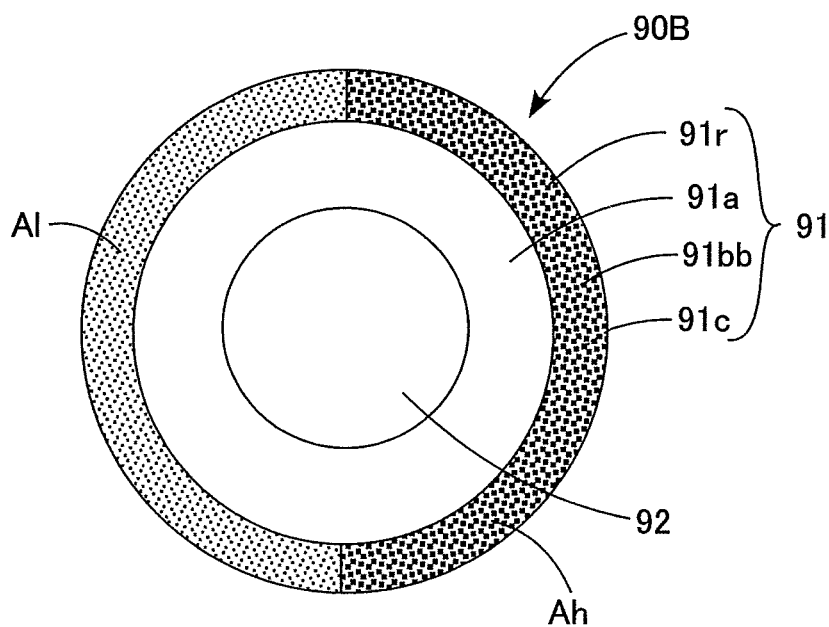
FIG. 12B is a front elevational view of the cutting tool according to a second modified embodiment used in the cutting device of FIG. 1.
Figure 12C:
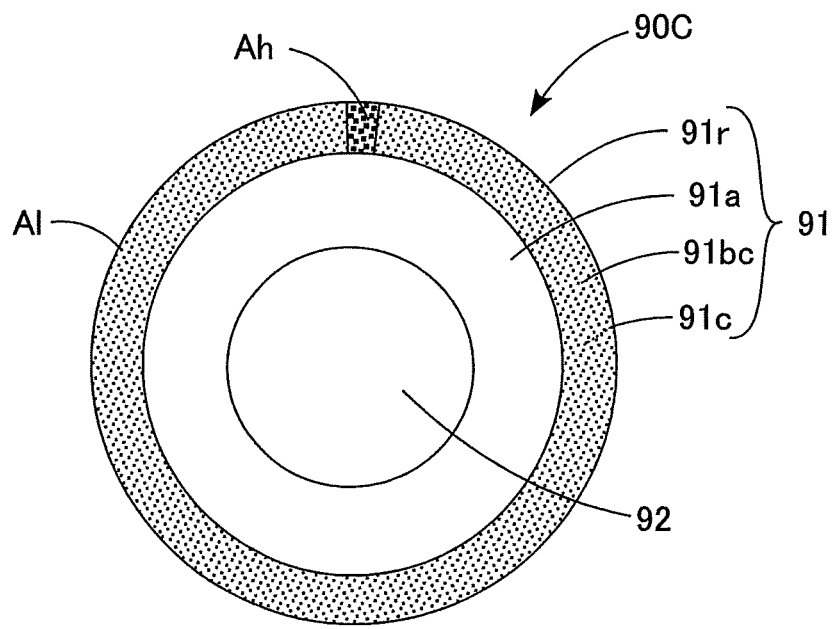
FIG. 12C is a front elevational view of the cutting tool according to a third modified embodiment used in the cutting device of FIG. 1.

According to the above embodiment, the rake surface 91b of the cutting tool 90 is formed to have a constant friction coefficient over the surface. However, as shown in FIGS. 12A, 12B and 12C, the rake surfaces 91ba, 91bb, and 91bc of the cutting tools 90A, 90B and 90C may be formed to have different friction coefficients over the respective surfaces. In other words, the cutting tool 90A shown in FIG. 12A has the rake surface 91ba formed by an area Ah having a high friction coefficient and an area Al having a low friction coefficient which are mutually arranged in a circumferential direction.

In the above case, when the lengths in circumferential direction of both areas Ah and Al are set to be the same length, the friction coefficient of the rake surface 91b becomes closer to the constant coefficient and the cross-cutting effect may be lessened. Accordingly, the length in the circumferential direction of the area Ah having high friction coefficient is set to be longer than the length in the circumferential direction of the area Al having low friction coefficient not to lessen the cross-cutting effect. The cutting tool 90B shown in FIG. 12B has the rake surface 91bb formed by the area Ah having the high friction coefficient and the area Al having the low friction coefficient each of which is arranged in the half of the rake surface 91bb in the circumferential direction. The cutting tool 90C shown in FIG. 12C has the rake surface 91bc formed by the area Al having the low friction coefficient, but the area Ah which friction coefficient is higher than the area Al is provided in a portion of the area Al having the low friction coefficient.

According to the cutting tools 90A, 90B and 90C, since the area Ah having high friction coefficient is in contact with the chip K for a long period of time, the chip flowing out can be accelerated. The area Al having low friction coefficient is formed by coating a diamond-like-carbon, for example. It is noted here that the ratio between the area Ah having the high friction coefficient and the area Al having the low friction coefficient is not limited to the ratio explained above and any randomly selected ratio may be applied.

Figure 13:
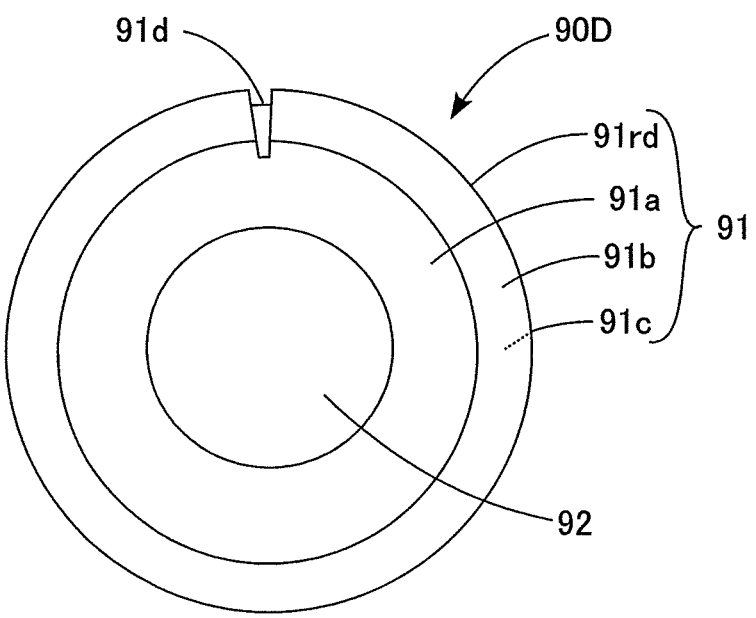
FIG. 13 is a front elevational view of the cutting tool according to a fourth modified embodiment used in the cutting device of FIG. 1.

According to the above embodiment, the cutting edge 91r is formed to be a continuing circular shape cutting edge 91r, i.e., a circular cutting edge 91r with non-discontinuing portion. However, as shown in FIG. 13, a portion of the cutting edge 91rd of the cutting tool 90D is provided with a groove 91d having a predetermined width 91dw, i.e., the cutting edge 91rd is formed in a dis-continuing circular shape. The groove 91d is formed, extending along the rake surface 91b from the relief surface 91c to the small diameter end surface 91a having the predetermined width 91dw. The cutting chip is divided into parts when the chip passes through the groove 91d. This enables an easy post treatment for the chips. It is noted that the number of groove is not limited to one, the groove may be provided at two or more portions.

According to the embodiment, the tool main body 91 of the cutting tool 90 is formed in a shape of a truncated cone. However, the tool main body may be formed in a columnar shape or a reverse truncated cone shape or the like, as long as the sectional plane perpendicular to the axis as a whole is in an annular shape. Further, an odd-even shaped portion of a petal shaped circle may be included as a circular shape. It is not limited to a strict circular shape, as long as the cutting tool is provided with a rake surface and a cutting edge at the circumferential surface side and functions as the rotary tool which pulls the chip by the rake surface. In case of forming such shape, the relief surface may interfere with the workpiece W when the rake surface is formed as a positive side and therefore, the relief surface should be formed as a negative side or a portion forming the relief surface should be recessed to prevent the interference with the workpiece W.

(Others)

According to the embodiment explained above, the cutting machining is performed under the state that the rotation axis line Rt of the cutting tool 90 is inclined by a predetermined angle θ in a cutting traveling direction from the state that the rotation axis line Rt is in parallel with the normal line of the cutting point Pt under the controlling of the cylindrical cutting by feeding in the plunge cutting direction using the cutting tool 90. However, the cutting machining may be performed under the state that the rotation axis line Rt of the cutting tool 90 is in parallel with the normal line of the cutting point Pt.

Further, under the constant peripheral speed ratio control, as the tool peripheral speed, the peripheral speed at the cutting edge 91r formed by the rake surface 91b and the relief surface 91c of the cutting tool 90 is used, however, as the tool peripheral speed, a peripheral speed at the intermediate portion in the axis line Rt of the cutting tool 90 at the rake surface 91b or a mean peripheral speed of the entire area of the rake surface 91*b* may be used. Still further, as the tool peripheral speed, the peripheral speed at a portion other than the intermediate portion in the axis line Rt at the rake surface 91*b* or a mean peripheral speed of a partial area (such as the area where the chip K is in contact) of the rake surface 91*b* may be used. The area of the rake surface 91*b* which is the area of calculating the mean peripheral speed may be the outer peripheral surface portions including the cutting edge 91*r*, or the cutting edge 91*r* is considered as a different area of the rake surface 91*b* and as such the cutting edge 91*r* may be excluded from the area of measuring the mean peripheral speed. Further, when the constant peripheral speed ratio control is performed, the peripheral speed ratio should be within the predetermined range value. However, it may be always controlled to keep the peripheral speed ratio to the value of "1.0".

Further, in the constant peripheral speed ratio control, the peripheral speed ratio is calculated based on the tool peripheral speed and the workpiece peripheral speed. However, the peripheral speed ratio can be obtained by setting the relationship between the chip K flowing out speed and the peripheral speed ratio in advance and then by obtaining the chip K flowing out speed upon actual cutting machining. The chip K flowing out speed can be obtained by analyzing the images taken by the high speed camera, or by setting the relationship between the thickness of the chip and the chip K flowing out speed in advance, and by measuring the thickness of the chip upon actual cutting machining.

Various types of control can be applied for a control using a flowing out angle/speed ratio control means, as long as the above explained numerical ranges are used as the machining conditions. The operating conditions of the cutting device, by which the above numerical ranges can be obtained, are obtained in advance by measuring by the experimental work or obtained by analyzing the measured result measured real-time during machining to reflect the results on the control device 80. Further, the following controlling may be included, wherein in spite of the feed-back from the measurement in advance and the real-time measurement, as a result of appropriate control of the cutting device 1 by the control device 80, the machining conditions which include the above numerical ranges can be obtained as the result system. This case can be applicable to the control by the flowing out speed/speed ratio control means and the control by the flowing out speed ratio control means.

Figure 14A:
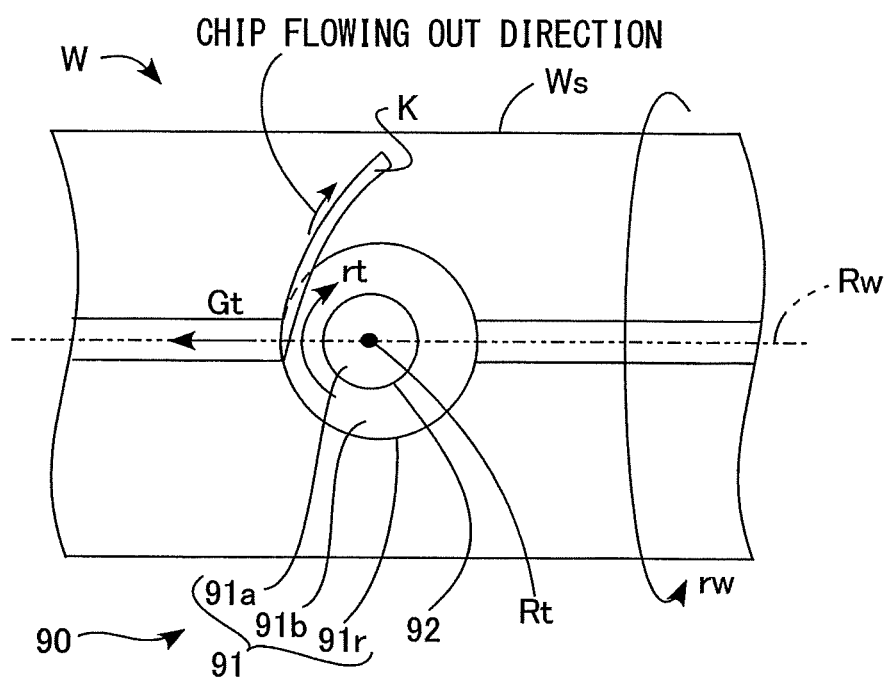
FIG. 14A is a view of the cutting tool seen from the front side thereof in a right angle direction relative to the rotation axis line of the workpiece indicating a cylindrical cutting state feeding in a traverse direction by the cutting tool according to FIG. 2A and FIG. 2B.
Figure 14B:
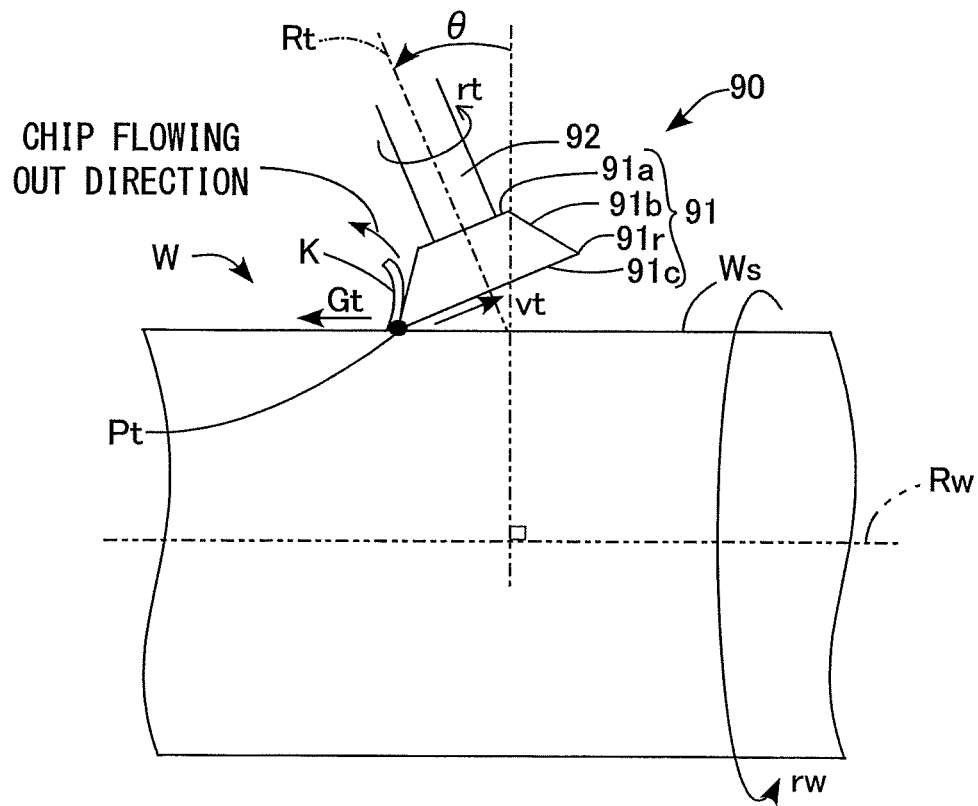
FIG. 14B is a view of the cutting tool seen from the side thereof in a right angle direction relative to the rotation axis line of the workpiece according to FIG. 14A.

According to the above embodiment, the explanation of the machining of the case, that the cutting machining surface Ws of the cylindrical workpiece W is cut in a circumferential direction, i.e., the case that the machining is performed by feeding the workpiece in X direction (plunge cutting feeding direction). However, the case that the machining is performed by making the workpiece travel in Z (traverse) direction is similarly performed. In other words, as shown in FIGS. 14A and 14B, the rotation axis line Rt of the cutting tool 90 is set to be inclined from the state that the axis line Rt is in parallel with the normal line of the cutting point Pt to the state that the axis line Rt is inclined by a predetermined angle θ with the normal line toward the cutting traveling direction Gt. Then, by rotating the rake surface 91*b* of the cutting tool 90 about the rotation axis line Rt in a rotation direction "rt" and at the same time rotating the workpiece W about the rotation axis line Rw in a rotation direction "rw", and by making the cutting tool 90 travel in a direction parallel with the rotation axis line Rw or making the workpiece W travel in a direction parallel with the rotation axis line Rw without making the cutting tool 90 travel, the cutting machining is performed on the cutting machining surface Ws of the workpiece W.

Figure 15A:
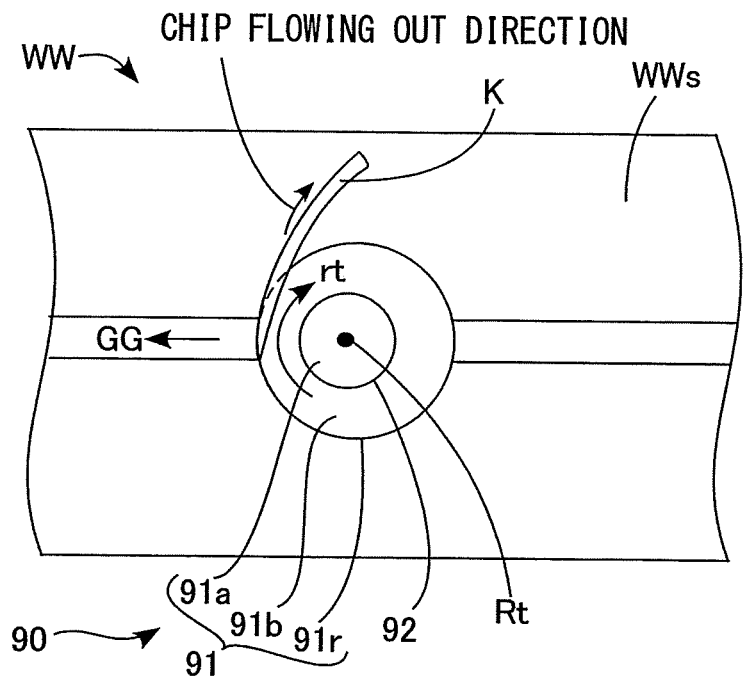
FIG. 15A is a view of the workpiece seen from a right angle direction relative to the plan of the workpiece indicating a plan surface cutting state by the cutting tool according to FIG. 2A and FIG. 2B.
Figure 15B:
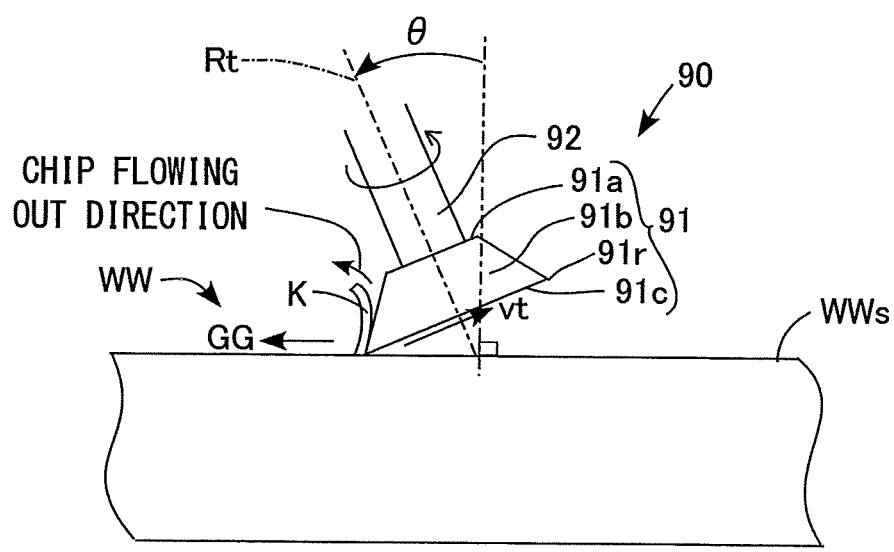
FIG. 15B is a view of FIG. 15A seen from a direction parallel to the plan surface.

According to the embodiment, the grinding machining of a cylinder is explained, but the cutting tool 90 can be applicable to the grinding machining of a flat surface. In other words, as shown in FIGS. 15A and 15B, the rotation axis line Rt of the cutting tool 90 is set to be inclined from the state that the axis line Rt is perpendicular to the flat cutting machining surface WWs of the workpiece WW to the state that the axis line Rt is inclined by a predetermined angle θ toward the cutting traveling direction Gt. Then, by rotating the rake surface 91*b* of the cutting tool 90 about the rotation axis line Rt in a rotation direction "rt" with a tool peripheral speed V and at the same time by making the cutting tool 90 travel along the cutting machining surface WWs of the workpiece WW with a traveling speed "v", or making the workpiece WW travel in a direction parallel with the cutting machining surface WWs of the workpiece WW without making the cutting tool 90 travel. Thus, the cutting machining is performed on the surface WWs to be cutting machined of the workpiece WW.

(Effects)

The cutting device 1 according to the embodiment includes a rotating means 70, etc., for rotating a cutting tool 90, 90A, 90B, 90C and 90D about a rotation axis line Rt of the cutting tool 90, 90A, 90B, 90C and 90D and a traveling means 40, etc., for making the cutting tool 90, 90A, 90B, 90C and 90D travel relative to a workpiece W and WW, wherein the rotating means 70, etc., and the traveling means 40, etc. perform a cutting machining on the workpiece W and WW by making the cutting tool 90, 90A, 90B, 90C and 90D travel relative to the workpiece, having an outer peripheral surface of the cutting tool 90, 90A, 90B, 90C and 90D rotate and function as a rake face 91*b*, 91*ba*, 91*bb* and 91*bc*. According to the cutting machining, the cutting tool 90, 90A, 90B, 90C and 90D performs a cross-cutting function to cut in the workpiece W and WW, the rake surface 91*b*, 91*ba*, 91*bb* and 91*bc* being rotated and a pulling function to pull and flow out a chip K with the rotating rake surface 91*b*, 91*ba*, 91*bb* and 91*bc* thereof. Therefore, according to the cutting machining, in addition to the dispersion of the cutting heat generated at the cutting edge 91*r* and 91*rd* due to the rotation of the cutting tool 90, 90A, 90B, 90C and 90D on the entire outer circumferential surface of the rake surface 91*b*, 91*ba*, 91*bb* and 91*bc*, the reduction of the cutting resistance force by the above functions can be achieved to reduce the temperature generated at the cutting edge 91*r* and 91*rd* so as to improve the tool life.

Further, the rotating means 70, etc. and traveling means 40 etc. perform cutting machining on the workpiece W and WW so that the peripheral speed of the cutting tool 90, 90A, 90B, 90C and 90D becomes equal to or more than a cutting speed of the cutting tool 90, 90A, 90B, 90C and 90D. In other words, the case that the peripheral speed ratio is 1.0 or more is included. When the peripheral speed ratio is equal to or more than 1.0, the flowing out speed that the chip K is pulled by the rake surface 91*b*, 91*ba*, 91*bb* and 91*bc* and is flown out from the cutting point Pt becomes equal to or more than a chip K generation speed by the cross-cutting function and therefore, the generated chip K keeps the tensioned state not to be loosened and a good machining result can be easily obtained. It is noted here that in order not to generate a large friction abrasion caused by the speed difference between the chip K generation speed and the peripheral speed of the rake surface 91*b*, 91*ba*, 91*bb* and 91*bc*, the peripheral speed ratio may be set equal to or more than 1.0 and equal to or less than 10.0. Preferably, when the peripheral speed ratio is equal to or more than 1.0 and less than 2.0, the chip K can be easily continuously flown out.

It is noted however, that the peripheral speed ratio is not limited to the ratio equal to or more than 1.0 and less than 1.0 may be included. Even when the peripheral speed ratio is less than 1.0, a good machining result, better than a conventional machining method, may be obtained by the pulling force at the rake surface 91*b*, 91*ba*, 91*bb* and 91*bc*. For example, the peripheral speed ratio may be equal to or more than 0.2 and less than 1.0 not to increase the friction abrasion at the rake surface 91*b*, 91*ba*, 91*bb* and 91*bc* due to a sliding of the chip K caused by the cross-cutting function by the cutting tool 90, 90A, 90B, 90C and 90D. Further, when the peripheral speed ratio is equal to or more than 0.5 and less than 1.0, the chips K can be easily continuously flown out. Since the cutting resistance can be largely reduced due to the cross-cutting and the pulling functions. Thus, the heat generation of the cutting tool 90, 90A, 90B, 90C and 90D can be suppressed to improve the tool life.

Further, since the chips K generated while the cutting machining is performed are under tensioned state by the pulling function at the rake surface 91*b*, 91*ba*, 91*bb* and 91*bc*, the interfering of the chips K with the cutting machining can be prevented and thus, a good machining result can be expected. Still further, since the peripheral speed of the cutting tool is defined to be a peripheral speed at a portion of the rake surface 91*b*, 91*ba*, 91*bb* and 91*bc* or a mean peripheral speed at an area of the rake surface 91*b*, 91*ba*, 91*bb* and 91*bc*, with which the chips K generated at the cutting machining are in contact, a highly accurate peripheral speed can be obtained.

Further, the cutting device 1 includes an inclining means 60, etc., for inclining a rotation axis line Rt of a cutting tool 90, 90A, 908, 90C and 90D. The inclining means 60, etc., inclines the rotation axis line Rt of the cutting tool 90, 90A, 90B, 90C and 90D in a cutting traveling direction Gp, Gt and GG of the cutting tool 90, 90A, 90B, 90C and 90D with a predetermined angle to perform a cutting machining on a workpiece W and WW.

Therefore, the cutting tool 90, 90A, 90B, 90C and 90D deflects in a direction rotated by the supplementary angle of the inclination angle θ relative to the cutting traveling direction Gp, Gt and GG. On the other hand, a rotary tool 100 in general deflects in a rotated direction with right angles relative to the cutting traveling direction Gp. Therefore, compared to the cutting edge 101*c* of the rotary tool 100, the cutting edge 91*r*, and 91*rd* of the cutting tool 90, 90A, 90B, 90C and 90D periodical separation from the cutting machining surface Ws and WW of the workpiece W and WW caused by the deflection. Thus, an influence of a rotation deflection of the cutting tool 90, 90A, 90B, 90C and 90D may difficult to be transferred on to the cutting machining surface Ws and WW. Thus, the cutting accuracy of the cutting machining surface Ws and WW can be improved.

Further, the cutting tool 90, 90A, 90B, 90C and 90D performs the cutting machining on the cylindrical workpiece W. This can obtain the workpiece W having a highly accurate cutting machining surface Ws. Also, the cutting tool 90, 90A, 90B, 90C and 90D performs the cutting machining on the flat surface workpiece WW. This can obtain the workpiece WW having a highly accurate cutting machining surface WWs.

Further, the cutting device 1 performs the cutting machining on the workpiece W and WW by arranging the cutting tool 90, 90A, 90B, 90C and 90D such that the rake angle becomes a positive angle value. Thus, the chips K can be smoothly flown out and the cutting resistance generated at the cutting machining by the cutting tool 90, 90A, 90B, 90C and 90D can be largely reduced to thereby reduce the generation of the heat at the cutting tool 90, 90A, 90B, 90C and 90D. Thus, the tool life can be improved.

Further, the rake surface 91*b*, 91*ba*, 91*bb* and 91*bc* of the cutting tool 90, 90A, 90B, 90C and 90D includes a circular shape at the sectional plane perpendicular to the axis. Thus, the structure of the cutting tool 90, 90A, 90B, 90C and 90D becomes simplified and becomes easy to be manufactured. Accordingly, the cutting tool which is low in manufacturing cost can be proposed. Further, the rake surface 91*b*, 91*ba*, 91*bb* and 91*bc* of the cutting tool 90, 90A, 90B, 90C and 90D includes a truncated cone shape. According to the cutting tool 90, 90A, 90B, 90C and 90D, the adjustment of the rake angle can be easily performed.

Further, the rake surface 91*b*, 91*ba*, 91*bb* and 91*bc* of the cutting tool 90, 90A, 90B, 90C and 90D includes areas Ah and Al in a circumferential direction having different friction coefficients. According to the cutting tool 90, 90B and 90C, the discharging of the chips K can be accelerated at the area having a high friction coefficient. The rake surface 91*bd* of the cutting tool 90D is provided with a groove 91*d* which can divide a chip K generated upon cutting machining into parts. According to the cutting tool 91D, since the chips K are divided into parts when passing through the groove 91*d*, this can facilitate the post treatment of the chips. K Further, a speed ratio constant control means is provided which controls the peripheral speed ratio v (speed ratio) between the peripheral speed V of the rake surface 91*b*, 91*ba*, 91*bb* and 91*bc* of the cutting tool 90, 90A, 90B, 90C and 90D and the peripheral speed v of the workpiece W (traveling speed when the workpiece W is made to travel relative to the cutting tool 90, 90A, 90B, 90C and 90D) or the speed ratio v between the peripheral speed V of the rake surface 91*b*, 91*ba*, 91*bb* and 91*bc* of the cutting tool 90, 90A, 90B, 90C and 90D and the moving speed v of the workpiece WW (traveling speed when the cutting tool 90, 90A, 90B, 90C and 90D is made to travel relative to the workpiece WW) to be constant within a predetermined range. Thus, the speed ratio is always kept constant when the cutting machining is performed and thus the tool life can be improved to realize a further highly efficient cutting machining.

Further, the speed ratio constant control means corresponds to the control device 80 which controls at least one of the peripheral speed V and the traveling speed v. The control device 80 includes a peripheral speed obtaining means for obtaining the peripheral speed V, traveling speed obtaining means for obtaining the traveling speed v and a speed ratio calculating means for calculating the speed ratio v based on each speed V and v which is obtained by the peripheral speed obtaining means and the traveling speed obtaining means, wherein the control device 80 controls at least one of the peripheral speed V and the traveling speed v so that the speed ratio v is kept within a predetermined range, when the speed ratio v calculated by the speed ratio calculating means exceeds the predetermined range. Thus, even when the shape of the workpiece W is changed, the peripheral speed ratio can be highly accurately kept to be constant to thereby elongate the tool life and further high efficiency can be achieved.

The workpiece W is a cylindrical object which rotates about the axis line Rw and the traveling speed v thereof corresponds to the peripheral speed of the cutting machining surface Ws (outer peripheral surface) of the workpiece W in a rotation direction. Therefore, the cutting machining of the cutting machining surface Ws of the workpiece W can be highly efficiently performed. Further, the workpiece WW is an object which is movable in a direction parallel with the cutting machining surface WWs (flat surface) and the traveling speed v thereof corresponds to the moving speed in a moving direction of the workpiece WW. Therefore, the cutting machining of the cutting machining surface WWs of the workpiece WW can be highly efficiently performed.

Further, the rake surface 91*b*, 91*ba*, 91*bb*, 91*bc* and 91*d* of the cutting tool 90, 90A, 90B, 90C and 90D is in the shape of truncated cone and the peripheral speed v thereof corresponds to the peripheral speed at the cutting edge 91*r* and 91*rd* formed by the rake surface 91*b*, 91*ba*, 91*bb*, 91*bc* and 91*d* of the cutting tool 90, 90A, 90B, 90C and 90D and the relief surface 91*c*. Thus, the frictional abrasion at the cutting edge 91*r* and 91*rd* can be reduced.

Further, the rake surface 91*b*, 91*ba*, 91*bb*, 91*bc* and 91*d* of the cutting tool 90, 90A, 90B, 90C and 90D is in the shape of truncated cone and the peripheral speed v thereof corresponds to the peripheral speed at the intermediate portion of the rake surface 91*b*, 91*ba*, 91*bb*, 91*bc* and 91*d* in the axis line Rt direction of the cutting tool 90, 90A, 90B, 90C and 90D. Thus, the rake surface 91*b*, 91*ba*, 91*bb*, 91*bc* and 91*d* can be uniformly frictionally abraded.

Further, the rake surface 91*b*, 91*ba*, 91*bb*, 91*bc* and 91*d* of the cutting tool 90, 90A, 90B, 90C is in the shape of truncated cone and the peripheral speed v thereof corresponds to the mean peripheral speed at the entire area of the rake surface 91*b*, 91*ba*, 91*bb*, 91*bc* and 91*d*. Thus, the entire area of the rake surface 91*b*, 91*ba*, 91*bb*, 91*bc* and 91*d* including the cutting edge 91*r* and 91*rd* can be uniformly frictionally abraded. Further, the speed ratio constant means controls the speed ratio v always to be 1.0. Thus, the friction work between the cutting tool 90, 90A, 90B, 90C and 90D and the workpiece W and WW becomes minimum and the tool life elongation effect can be obtained.

Further, the speed ratio constant control means controls the speed ratio v to be equal to or more than 0.2. Further, the speed ratio constant control means controls the speed ratio v to be equal to or more than 1.0. Further the speed ratio constant control means controls the speed ratio v to be equal to or more than 2.0. Still further, a flowing out angle/speed ratio control means is provided for controlling the flowing out angle of the chip K upon performing cutting machining on the workpiece W and WW by the cutting tool 90, 90A, 90B, 90C and 90D to be equal to or more than 30 degrees and equal to or less than 70 degrees and for controlling the speed ratio v between the peripheral speed at the outer peripheral surface of the cutting tool 90, 90A, 90B, 90C and 90D and the traveling speed when the cutting tool 90, 90A, 90B, 90C and 90D is made to travel relative to the workpiece W and WW to be equal to or more than 0.2. By using the above defined numerical ranges, the pulling function of the chip K can be easily obtained, thereby to obtain a good machining result.

Further, the flowing out angle/speed ratio control means controls the speed ratio v to be equal to or more than 1.0. Further, the speed ratio constant control means controls the speed ratio v to be equal to or more than 2.0. Further, the flowing out angle/speed ratio control means controls the flowing out speed ratio between the chip K flowing out speed upon performing cutting machining on the workpiece W and WW by the cutting tool 90, 90A, 90B, 90C and 90D and the peripheral speed of the outer peripheral surface of the cutting tool 90, 90A, 90B, 90C and 90D to be equal to or more than 0.5 and equal to or less than 1.3 and controls the speed ratio v to be equal to or more than 0.2. The flowing out angle/speed ratio control means corresponds to the control device 80 which controls at least one of the peripheral speed and the traveling speed. By using the numerical ranges, the pulling function of the chip K can be easily obtained, thereby to obtain a good machining result.

Further, a flowing out speed/speed ratio control means is provided for controlling the flowing out speed ratio between the chip K flowing out speed upon performing cutting machining on the workpiece W and WW by the cutting tool 90, 90A, 90B, 90C and 90D and the peripheral speed of the outer peripheral surface of the cutting tool 90, 90A, 90B, 90C and 90D to be equal to or more than 0.5 and equal to or less than 1.3 and further controlling the speed ratio v between the peripheral speed of the outer peripheral surface of the cutting tool 90, 90A, 90B, 90C and 90D and the traveling speed when the cutting tool 90, 90A, 90B, 90C and 90D and the workpiece W and WW are relatively fed, to be equal to or more than 0.2. The flowing out speed/speed ratio control means corresponds to the control device 80 which controls at least one of the peripheral speed and the traveling speed. By using the numerical ranges, the pulling function of the chip K can be easily obtained, thereby to obtain a good machining result.

Still further, a flowing out speed ratio control means is provided for controlling the flowing out angle of the chip K upon performing cutting machining on the workpiece W and WW by the cutting tool 90, 90A, 90B, 90C and 90D to be equal to or more than 30 degrees and equal to or less than 70 degrees and controlling a flowing out speed ratio between the chip K flowing out speed upon performing cutting machining on the workpiece W and WW by the cutting tool 90, 90A, 90B, 90C and 90D and the peripheral speed of the outer peripheral surface of the cutting tool 90, 90A, 90B, 90C and 90D to be equal to or more than 0.5 and equal to or less than 1.3. The flowing out speed ratio control means corresponds to the control device 80. By using the numerical ranges, the pulling function of the chip K can be easily obtained, thereby to obtain a good machining result.

The method for cutting according to the embodiment of the present invention includes steps of rotating an outer peripheral surface of the cutting tool 90, 90A, 90B, 90C and 90D about the rotation axis line Rt of the cutting tool 90, 90A, 90B, 90C and 90D and performing a cutting machining on a workpiece W and WW by making the cutting tool 90, 90A, 90B, 90C and 90D travel relative to the workpiece W and WW, having the outer peripheral surface of the cutting tool function as a rake surface 91*b*, 91*ba*, 91*bb* and 91*bc* and 91*d* and by controlling a peripheral speed of the cutting tool to be equal to or more than a cutting speed of the cutting tool. The end surface of the cutting tool 90, 90A, 90B, 90C and 90D is formed to be a relief surface 91*c*. Thus, the effects obtained by the cutting device 1 can be obtained by this cutting method.

REFERENCE SIGNS LIST

1; cutting device, 70, 71, 72 and 85; rotating means, 40, 21*a*, 21*b*, 22, 50, 41*a*, 41*b*, 42, 82 and 83; traveling means, 60, 61, 62 and 84; inclining means, 90, 90A, 90B, 90C and 90D; cutting tool, 91*b*, 91*ba*, 91*bb* and 91*bc*; outer peripheral surface (rake surface) of tool main body, 91*c*; large diameter end surface (relief surface) of the tool main body, 91*r*, 91*rd*; ridge line between the outer peripheral surface and the large diameter end surface of the tool main body (cutting edge), α; cutting edge angle, β; nominal cutting edge angle, θ; inclination angle of the rotation axis line of the cutting tool, Gp; GG; cutting traveling direction, W; workpiece.

The invention claimed is:

1. A cutting device comprising:
   a work holder configured to support a workpiece for rotation about a workpiece rotation axis;
   a tool holder configured to support a cutting tool for rotation about a tool rotation axis, wherein the tool rotation axis is oriented to the workpiece rotation axis such that when a workpiece is mounted to the work holder and rotated about the workpiece rotation axis, and a cutting tool having an outer peripheral surface, and also having an end surface extending perpendicular to the tool rotation axis and joining the outer peripheral surface at a cutting edge, is mounted to the tool holder and rotated about the tool rotation axis and caused to engage and cut the workpiece, the outer peripheral surface and the end surface function as a rake surface and a relief surface, respectively; and
   a controller having:
      means for controlling a rotational speed about the tool rotation axis of the cutting tool mounted to the tool holder,
      means for controlling a rotational speed about the workpiece rotation axis of the workpiece mounted to the work holder,
      means for providing relative movement of the tool holder relative to the workpiece axis such that the cutting tool mounted to the tool holder and rotated about the tool rotation axis is caused to engage the workpiece mounted to the work holder and rotated about the workpiece rotation axis, and to perform a cutting operation, and
      means for causing a cutting tool peripheral speed at the cutting edge during the cutting operation to be equal to or more than a cutting speed of the cutting tool performing a cutting operation when the cutting tool mounted to the tool holder and rotated about the tool rotation axis engages the workpiece mounted to the work holder and rotated about the workpiece rotation axis, and the cutting tool mounted to the tool holder is subject to the relative movement of the tool holder relative to the workpiece axis,
      whereby said cutting speed is the result of the rotational speed about the tool rotation axis of the cutting tool mounted to the tool holder, the rotational speed about the workpiece rotation axis of the workpiece mounted to the work holder, and the relative movement of the tool holder relative to the workpiece axis.

2. A cutting method comprising steps of:
   providing a workpiece to rotate about a workpiece rotation axis;
   providing a cutting tool to rotate about a tool rotation axis, the cutting tool having an outer peripheral surface, and also having an end surface extending perpendicular to the tool rotation axis and joining the outer peripheral surface at a cutting edge;
   causing the rotating cutting tool to engage the rotating workpiece and perform a cutting operation in which the outer peripheral surface and the end surface function as a rake surface and a relief surface, respectively during the cutting operation; and
   controlling a peripheral speed of the cutting tool at the cutting edge during the cutting operation to be equal to or more than a cutting speed of the cutting tool performing a cutting operation when the cutting tool mounted to the tool holder and rotated about the tool rotation axis engages the workpiece mounted to the work holder and rotated about the workpiece rotation axis, and the cutting tool mounted to the tool holder is subject to the relative movement of the tool holder relative to the workpiece axis,
   whereby said cutting speed is the result of the rotational speed about the tool rotation axis of the cutting tool mounted to the tool holder, the rotational speed about the workpiece rotation axis of the workpiece mounted to the work holder, and the relative movement of the tool holder relative to the workpiece axis.

* * * * *